(12) United States Patent
Takeda et al.

(10) Patent No.: US 10,560,889 B2
(45) Date of Patent: Feb. 11, 2020

(54) USER TERMINAL, RADIO BASE STATION, RADIO COMMUNICATION METHOD, AND RADIO COMMUNICATION SYSTEM

(71) Applicant: NTT DOCOMO, INC., Tokyo (JP)

(72) Inventors: Kazuki Takeda, Tokyo (JP); Kazuaki Takeda, Tokyo (JP); Tooru Uchino, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 103 days.

(21) Appl. No.: 15/107,142

(22) PCT Filed: Dec. 15, 2014

(86) PCT No.: PCT/JP2014/083070
§ 371 (c)(1),
(2) Date: Jun. 22, 2016

(87) PCT Pub. No.: WO2015/098583
PCT Pub. Date: Jul. 2, 2015

(65) Prior Publication Data
US 2017/0041865 A1 Feb. 9, 2017

(30) Foreign Application Priority Data

Dec. 26, 2013 (JP) .................................. 2013-268332

(51) Int. Cl.
*H04W 48/18* (2009.01)
*H04L 5/00* (2006.01)
(Continued)

(52) U.S. Cl.
CPC ............... *H04W 48/18* (2013.01); *H04L 1/00* (2013.01); *H04L 5/001* (2013.01); *H04L 5/0032* (2013.01);
(Continued)

(58) Field of Classification Search
CPC ............... H04W 48/18; H04W 72/127; H04W 72/1289; H04W 76/025; H04W 88/02;
(Continued)

(56) References Cited

U.S. PATENT DOCUMENTS

| 2013/0100906 A1* | 4/2013 | Yano | H04L 1/0026 370/329 |
| 2015/0304074 A1* | 10/2015 | Seo | H04W 74/004 370/329 |

OTHER PUBLICATIONS

"Sharp, PCell vs. SCell with PUCCH for inter-eNB CA"; 3GPP TSG-RAN WG2 Meeting#82, R2-132052; Fukuoka, Japan, May 20-24, 2013, IDS filed on Jan. 18, 2017.*
(Continued)

*Primary Examiner* — Hardikkumar D Patel
(74) *Attorney, Agent, or Firm* — Osha Liang LLP

(57) ABSTRACT

A user terminal that communicates with a plurality of cell groups (CG), each group being formed with one or more cells to use different frequency bands, and a control section that selects at least one cell, from the cells where uplink control signals can be allocated, which are configured in each CG, and controls the cell to transmit the uplink control signals. When information to indicate cross-carrier scheduling (CCS) is included in a downlink control signal, the control section decides whether or not the cell having received the downlink control signal and the cell that is designated by the information to indicate CCS belong to the same CG, and selects the cell based on this decision. Thus, the decrease of overall system performance can be reduced even when CCS and uplink control signal transmission in secondary cells are employed at the same time.

3 Claims, 22 Drawing Sheets

(51) Int. Cl.
| | |
|---|---|
| *H04L 1/00* | (2006.01) |
| *H04W 72/12* | (2009.01) |
| *H04W 76/15* | (2018.01) |
| *H04W 88/02* | (2009.01) |
| *H04W 88/08* | (2009.01) |

(52) U.S. Cl.
CPC ....... *H04L 5/0098* (2013.01); *H04W 72/1278* (2013.01); *H04L 1/0003* (2013.01); *H04L 1/0009* (2013.01); *H04L 1/0026* (2013.01); *H04L 5/0023* (2013.01); *H04W 72/1289* (2013.01); *H04W 76/15* (2018.02); *H04W 88/02* (2013.01); *H04W 88/08* (2013.01)

(58) Field of Classification Search
CPC . H04W 88/08; H04W 72/1278; H04W 76/15; H04L 5/001; H04L 1/00; H04L 5/0032; H04L 5/0098; H04L 1/0003; H04L 1/0009; H04L 1/0026; H04L 5/0023
See application file for complete search history.

(56) References Cited

OTHER PUBLICATIONS

Office Action issued in the counterpart Japanese Patent Application No. 2013-268332, dated Mar. 14, 2017 (5 pages).
Office Action issued in corresponding Japanese Application No. 2013-268332, dated Oct. 25, 2016 (5 pages).
Sharp; "PCell vs. SCell with PUCCH for inter-eNB CA"; 3GPP TSG-RAN WG2 Meeting #82, R2-132052; Fukuoka, Japan; May 20-24, 2013 (6 pages).
International Search Report issued in corresponding application No. PCT/JP2014/083070 dated Mar. 10, 2015 (4 pages).
Written Opinion of the International Searching Authority issued in corresponding application No. PCT/JP2014/083070 dated Mar. 10, 2015 (4 pages).
3GPP TS 36.300 V11.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).
InterDigital Communications, "Special Cell for SeNB with Dual Connectivity"; 3GPP TSG-RAN WG2 #84, Tdoc R2-134398; San Francisco, USA; Nov. 11-15, 2013 (3 pages).
Office Action issued in corresponding Algerian Patent Application No. DZ/P/2016/000353, dated Jul. 2, 2017 (2 pages).
Extended European Search Report issued in corresponding European Patent Application No. 14874193.7, dated Jul. 25, 2017 (13 pages).
NSN, et al., "On the need of PCell functionality in SeNB," 3GPP TSG-RAN WG2 Meeting #84, R2-134188, San Francisco, USA, Nov. 11-15, 2013 (4 pages).

\* cited by examiner

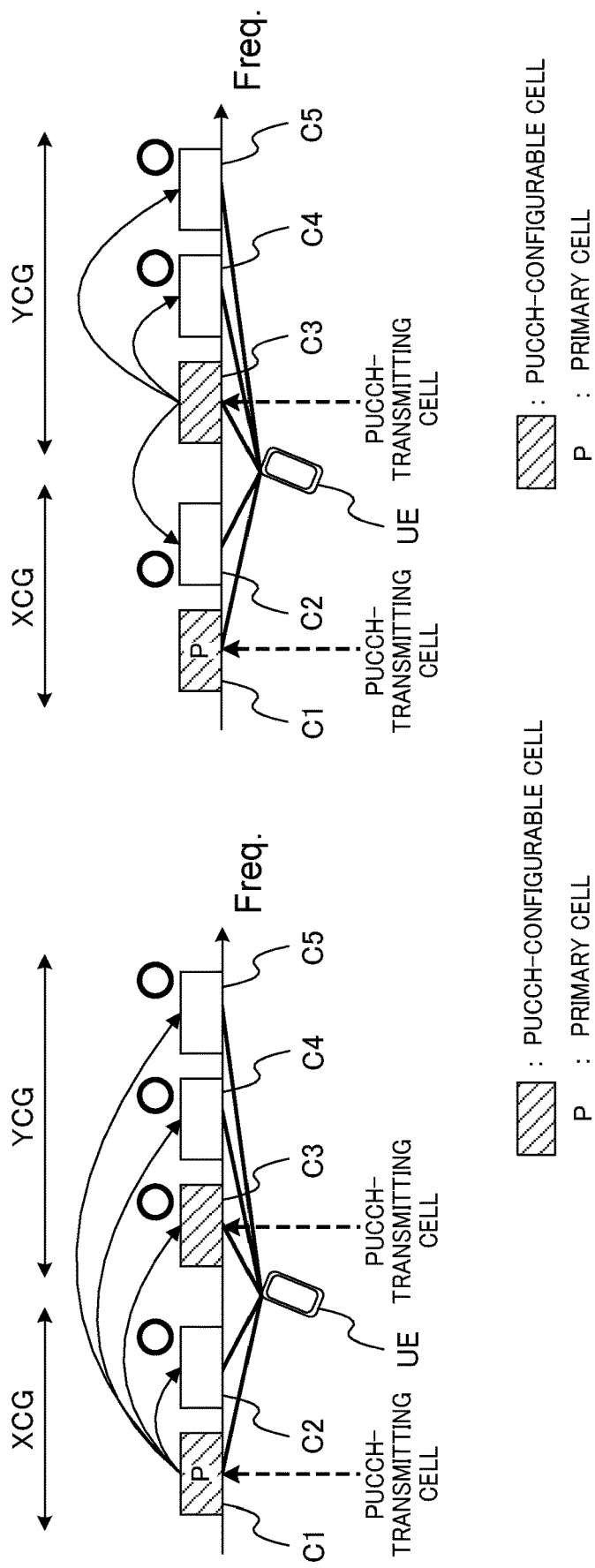

| CIF VALUE | PDSCH-RECEIVING CELL | PUCCH-TRANSMITTING CELL |
|---|---|---|
| 0 | PCell | PCell |
| 1 | SCell(1) | PCell |
| 2 | SCell(2) | SCell(2) |
| 3 | SCell(3) | SCell(2) |
| 4 | SCell(4) | SCell(2) |
| 5 | — | |
| 6 | — | |
| 7 | — | |

FIG.17A

| CIF VALUE | PDSCH-RECEIVING CELL | PUCCH-TRANSMITTING CELL |
|---|---|---|
| 0 | PCell | PCell |
| 1 | SCell(1) | PCell |
| 2 | SCell(2) | PCell |
| 3 | SCell(3) | PCell |
| 4 | SCell(4) | PCell |
| 5 | SCell(2) | SCell(2) |
| 6 | SCell(3) | SCell(2) |
| 7 | SCell(4) | SCell(2) |

FIG.17B

USER TERMINAL, RADIO BASE STATION, RADIO COMMUNICATION METHOD, AND RADIO COMMUNICATION SYSTEM

TECHNICAL FIELD

The present invention relates to a user terminal, a radio base station, a radio communication method and a radio communication system that are applicable to a next-generation communication system.

BACKGROUND ART

In the UMTS (Universal Mobile Telecommunications System) network, the specifications of long-term evolution (LTE) have been drafted for the purpose of further increasing high speed data rates, providing lower delay and so on (see non-patent literature 1). In LTE, as multiple access schemes, a scheme that is based on OFDMA (Orthogonal Frequency Division Multiple Access) is used in downlink channels (downlink), and is used in uplink channels (uplink). Also, successor systems of LTE (referred to as, for example, "LTE-advanced" or "LTE enhancement" (hereinafter referred to as "LTE-A")) are under study for the purpose of achieving further broadbandization and increased speed beyond LTE, and the specifications thereof have been drafted as Rel. 10/11.

Also, the system band of the LTE-A system (Rel. 10/11) includes at least one component carrier (CC), where the system band of the LTE system constitutes one unit. Gathering a plurality of CCs to achieve a wide band in this way is referred to as "carrier aggregation" (CA). Note that CCs will be hereinafter simply referred to as "cells."

Also, in LTE Rel. 10/11, cross-carrier scheduling (CCS) is introduced in order to realize stable transmission/receipt of control signals. CCS makes it possible to report downlink control information (DCI) pertaining to a cell that transmits/receives signals using a shared data channel (PDSCH (Physical Downlink Shared Channel)/PUSCH (Physical Uplink Shared Channel)), via a control channel (PDCCH: Physical Downlink Control Channel) that is allocated to another cell.

In another successor system of LTE (LTE Rel. 12), various scenarios, in which a plurality of cells use frequency bands (carriers), are under study. When the radio base stations to form a plurality of cells are substantially the same, above-described CA (also referred to as "intra-eNB CA") can be applied. On the other hand, when the radio base stations to form a plurality of cells are completely different, dual connectivity (DC) (also referred to as "inter-eNB CA") may be applied. When DC is used, a user terminal needs to be structured to be able to allocate uplink control information (UCI) to an uplink control channel (PUCCH: Physical Uplink Control Channel) and send feedback to the radio base stations, not only in the primary cell (PCell), but also in at least one secondary cell (SCell). Hereinafter, the sending of UCI feedback via the PUCCH in at least one SCell will be also referred to as "PUCCH on SCell."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Either in CA or in DC, a system to employ CCS and PUCCH on SCell at the same time may be possible. However, the operation for when CCS and PUCCH on SCell are employed at the same time have never been studied, and therefore there is a threat that the understanding as to which cell should send UCI feedback in response to CCS might vary between the radio base stations and user terminals and a decrease in overall system performance may be caused.

The present invention has been made in view of the above, and it is therefore one object of the present invention to provide a user terminal, a radio base station, a radio communication method and a radio communication system which can reduce the decrease of overall system performance even when CCS and PUCCH on SCell are employed at the same time in a system in which a plurality of radio base stations and user terminals communicate using CA or DC.

Solution to Problem

The user terminal according to an embodiment of the present invention provides a user terminal that communicates with a plurality of cell groups, each group being formed with one or more cells that use different frequency bands, and this user terminal has a receiving section that receives downlink signals transmitted from each cell, and a control section that selects at least one cell, from cells, to which uplink control signals can be allocated, and which are configured in each cell group, and controls the cell as a cell to transmit the uplink control signals, and, when information to indicate cross-carrier scheduling is included in a downlink control signal that is received in the receiving section, the control section decides whether or not a cell having received the downlink control signal and a cell that is designated by the information to indicate cross-carrier scheduling belong to the same cell group, and selects the cell based on this decision.

Advantageous Effects of Invention

According to the present invention, it is possible to reduce the decrease of overall system performance even when CCS and PUCCH on SCell are employed at the same time.

BRIEF DESCRIPTION OF DRAWINGS

FIG. 14 provide diagrams to show examples of PUCCH-transmitting cells that are selected by a user terminal according to example 2.2 of an embodiment of the present invention when a PDCCH to report CCS that spans over CGs and CCS that does not span over CGs at the same time is detected;

FIG. 17 provide diagrams to show examples of CIFs that are configured in association with PUCCH-transmitting cells in CA;

DESCRIPTION OF EMBODIMENTS

Now, an embodiment of the present invention will be described below in detail with reference to the accompanying drawings. Note that, when the following description refers to the physical downlink control channel (PDCCH: Physical Downlink Control Channel), this will cover the enhanced physical downlink control channel (EPDCCH: Enhanced PDCCH) as well. Also, when the following description mentions that a channel (the PUCCH, the PDCCH and/or the like) is transmitted/received, this will mean that signals are transmitted/received via that channel. Also, when the following description simply refers to the uplink and the downlink, these will mean uplink channels and downlink channels, respectively.

In the LTE-A system, a HetNet (Heterogeneous Network), in which small cells, each having local a coverage area of a radius of approximately several tens of meters, are formed within a macro cell having a wide coverage area of a radius of approximately several kilometers, is under study. Carrier aggregation (CA) and dual connectivity (DC) are applied to the HetNet structure. Note that these may be applied to other network structures as well.

In the HetNet structure, a scenario to place small cells densely is under study in order to support the further growth of traffic. In this scenario, it is preferable to secure coverage by using a carrier of a relatively low frequency band in the macro cell, and secure a wide band by using a carrier of a relatively high frequency band in the small cells. In the macro cell layer, wide coverage and mobility are secured by establishing a control plane (C (Control)-plane) connection and supporting high transmission power density in a low frequency band. On the other hand, in the dense small cell layer, a user plane (U (User)-plane) connection, which is specifically for data, is established, so that capacity is secured in a high frequency band and the throughput increases. Note that a small cell may be referred to as a phantom cell, a pico cell, a nano cell, a femto cell, a micro cell and so on.

FIG. 1 provide schematic diagrams of carrier aggregation (CA) and dual connectivity (DC). A user terminal UE communicates with radio base stations eNB1 and eNB2. FIG. 1 show control signals that are transmitted/received via a physical downlink control channel (PDCCH: Physical Downlink Control Channel) and a physical uplink control channel (PUCCH: Physical Uplink Control Channel), respectively. For example, downlink control information (DCI) is transmitted via the PDCCH. Also, uplink control information (UCI) is transmitted via the PUCCH. Note that the DCI that is transmitted via the PDCCH may be referred to simply as downlink control signals (PDCCH signal), and the UCI that is transmitted via the PUCCH may be referred to simply as uplink control signals (PUCCH signal).

Figure 1B:
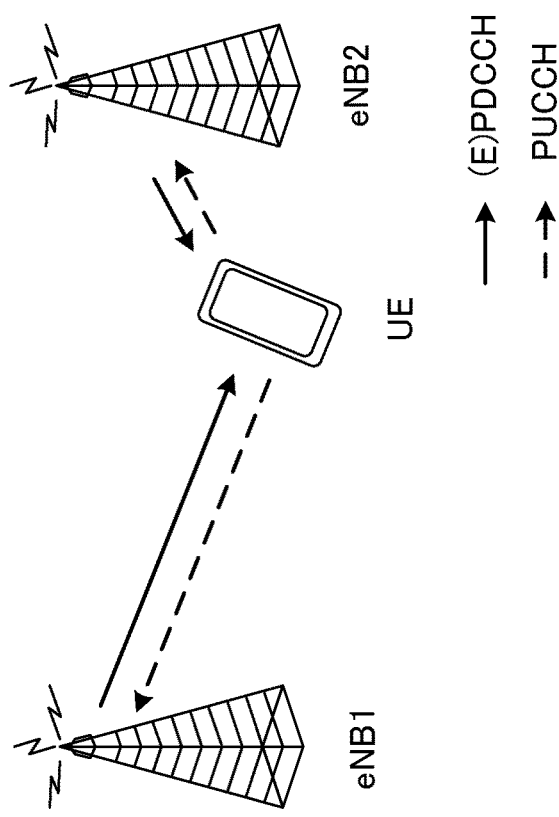
FIG. 1 provide schematic diagrams of carrier aggregation (CA) and dual connectivity (DC)
Figure 1A:
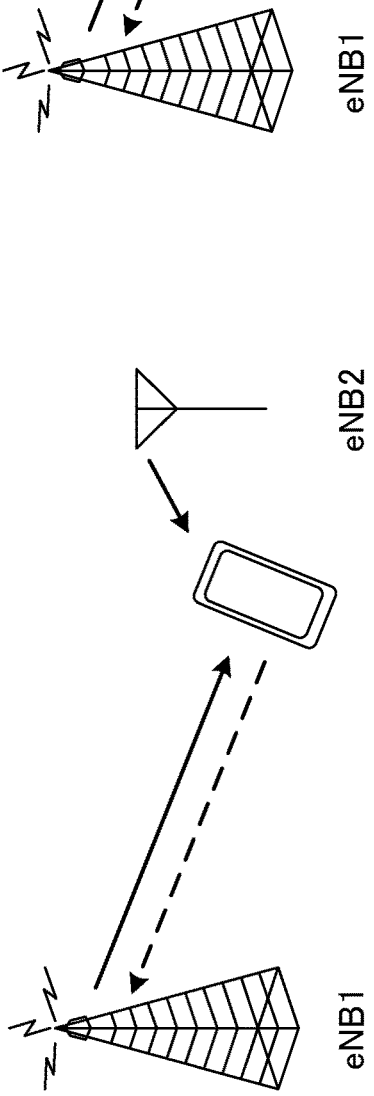

FIG. 1A shows communication by eNB1, eNB2 and a UE, which are engaged in CA. In FIG. 1A, for example, eNB1 is a radio base station to form a macro cell (hereinafter referred to as the "macro base station") and eNB2 is a radio base station to form a small cell (hereinafter referred to as the "small base station"), but this structure is by no means limiting. For example, the small base station may be structured like an RRH (Remote Radio Head) that is connected with the macro base station. When CA is employed, one scheduler (for example, the scheduler provided in the macro base station eNB1) controls the scheduling of multiple cells. From this, CA (Rel. 10/11 CA) may be referred to as intra-base station CA (intra-eNB CA), but hereinafter will be simply referred to as "CA."

This structure assumes that the base stations are connected with a high-speed channel (also referred to as an "ideal backhaul") such as optical fiber. Consequently, the UE has only to transmit UCI pertaining to each cell via the PUCCH of one cell (for example, the PCell). For example, HARQ (Hybrid Automatic Repeat reQuest) delivery acknowledgment response signals (also referred to as "retransmission control signals") in response to the PDSCH signals transmitted in the PCell (macro cell) and the SCell (small cell) are aggregated and allocated to the PCell's PUCCH resources. In this case, it is not necessary to transmit a plurality of acknowledgment response signals at the same time, so that uplink coverage can be easily secured.

Meanwhile, FIG. 1B shows communication by eNB1, eNB2 and a UE, which are engaged in DC. In FIG. 1B, for example, eNB1 and eNB2 are macro base stations, but this structure is by no means limiting. When DC is employed, a plurality of schedulers are provided separately, and these multiple schedulers (for example, the scheduler provided in the macro base station eNB1 and the scheduler provided in the macro base station eNB2) control the scheduling of one or more pertaining cells. From this, DC may be referred to as inter-base-station CA (inter-eNB CA).

This structure assumes connecting between the base stations via a non-ideal backhaul, which produces delays that cannot be neglected. For example, the X2 interface may be used for the connection. Consequently, the UE needs to feed back, for every radio base station, UCI pertaining to the cell formed by that radio base station. That is, the UE needs to allocate the PUCCH to radio resources of at least one SCell, in addition to the PCell, and send UCI feedback (PUCCH on SCell). In this way, in DC, a UE has to transmit the PUCCH in at least two cells, but this gives a characteristic that an effect of improving throughput is provided, as in CA, without connecting between cells with an ideal backhaul.

Figure 2:
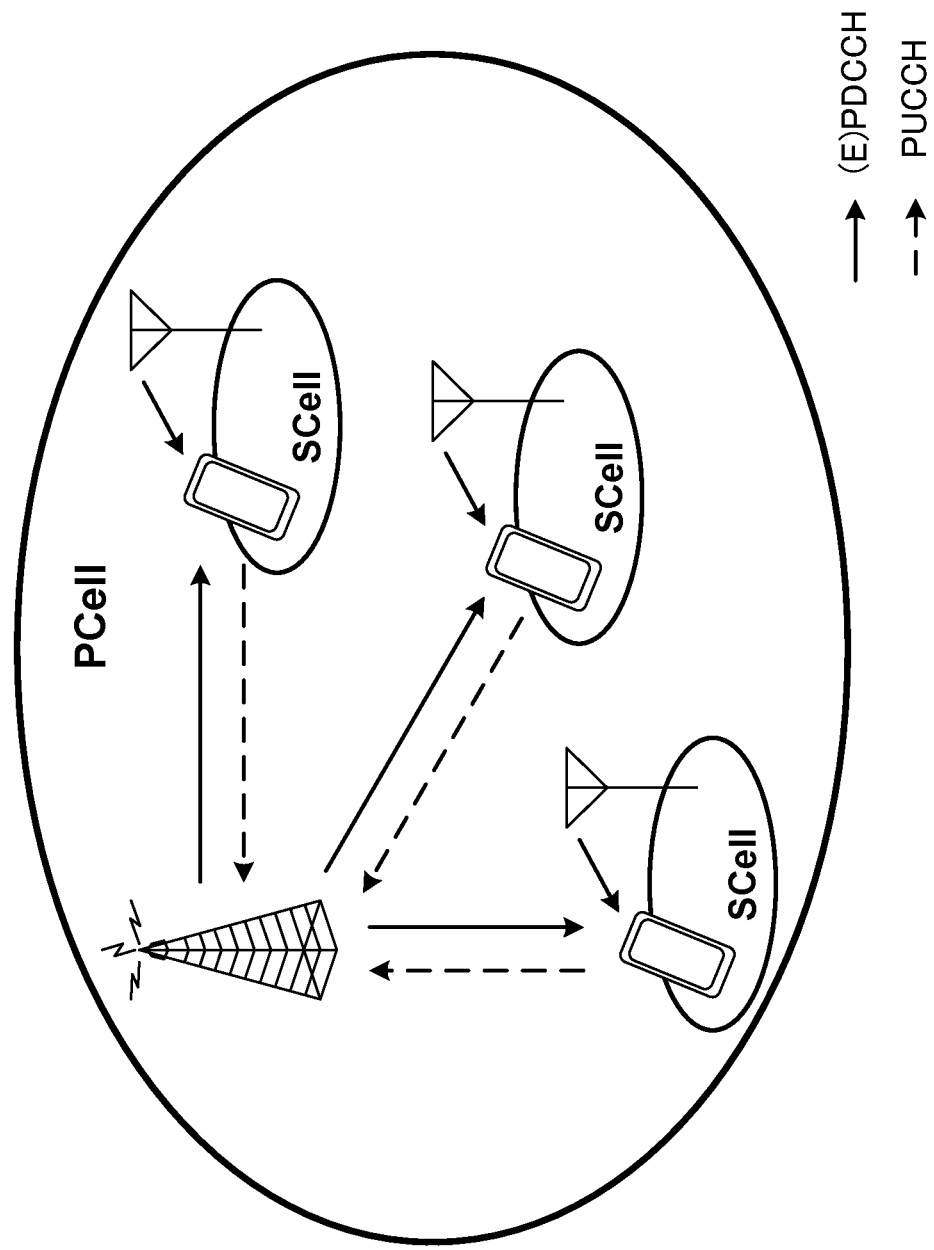
FIG. 2 is a schematic diagram of a deployment scenario 4 in carrier aggregation.

In CA, too, a study is in progress to allocate the PUCCH to SCells, as in DC. This will be described with reference to FIG. 2. FIG. 2 is a schematic diagram of a deployment scenario 4 in CA. In FIG. 2, the macro cell is the PCell and the small cells are SCells. In accordance with CA deployment scenario 4 (deployment scenario #4), a structure is provided in which the macro cell's coverage is secured in a frequency F1, and the macro cell's traffic is off-loaded to the small cells formed by RRHs (Remote Radio Heads) in a frequency F2 (F1<F2). This structure makes it possible to achieve effects of securing mobility with the macro cell and increasing capacity with the small cells.

However, as mentioned earlier, UCI feedback using the PUCCH can be sent only via the PCell in CA, and therefore the traffic pertaining to UCI feedback in the uplink of the macro cell grows as the number of small cells increases in deployment scenario 4. This may give a threat that the PUCCH makes the macro cell's uplink resources scarce, and places a limitation on the effect of increasing capacity with the small cells.

So, by allocating the PUCCH to SCells as in DC, in CA deployment scenario 4, a user terminal becomes capable of off-loading UCI feedback to the small cells. However, in order to make this possible, the user terminal needs to be able to use uplink CA (UL-CA).

Considering the cost of devices and the feasibility of implementation, it is preferable to determine the allocation of the PUCCH to SCells in accordance with rules that are common between CA and DC. Now, the allocation of the PUCCH to SCells will be described with reference to FIG. 3. FIG. 3 provide diagrams to show examples of PUCCH allocation to SCells in DC or in CA. In FIG. 3, the horizontal axis represents frequency, and five cells to use radio resources of predetermined frequency bands and a user terminal UE are shown connected.

Note that, hereinafter, a cell that is configured so that the PUCCH can be allocated will be referred to as a "PUCCH-configurable cell." Also, an SCell that is configured so that the PUCCH can be allocated will be referred to as a "PUCCH-configurable SCell." PUCCH-configurable cells may include both the PCell and PUCCH-configurable SCells.

Figures 3A, 3B:
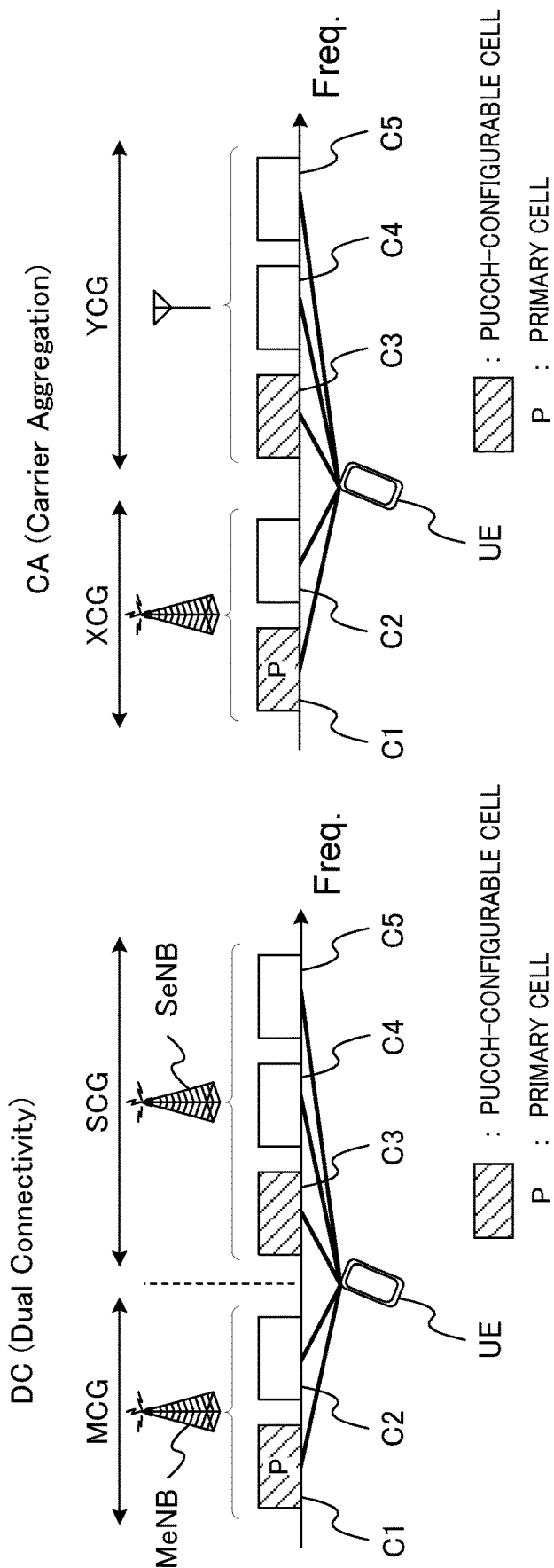
FIG. 3 provide diagrams to show examples of PUCCH allocation to SCells.

FIG. 3A is a diagram to show an example of PUCCH allocation to SCells in DC. In DC, each radio base station configures a cell group (CG) that is formed with one cell or a plurality of cells. Each CG is likely to be constituted with one or more cells that are formed by the same radio base station or with one or more cells that are formed by the same transmission point (transmitting antenna device, transmission station, etc.), but the actual operation is by no means limited to this. The CG to include the PCell will be referred to as the "master cell group (MCG)," and CGs other than the MCG will be referred to as "secondary cell groups (SCGs)." Also, a structure is employed here in which two or more cells can execute CA in each CG, but the total number of cells constituting the MCG and/or an SCG becomes equal to or less than a predetermined value (for example, five cells). This predetermined value may be determined in advance, or may be configured dynamically between eNBs and UEs. Also, depending on the implementation of UEs, the total number of cells to constitute the MCG and SCGs, the combination of cells and so on that can be configured may be reported to the eNBs, in the form of capability signaling. Also, the radio base station where the MCG is configured will be referred to as the "master base station (MeNB)," and the radio base station where an SCG is configured will be referred to as a "secondary base station (SeNB)."

In FIG. 3A, a UE is connected with five cells (C1 to C5). C1 is the PCell, and C2 to C5 are SCells. Also, C1 and C2 constitute the MCG, and C3 to C5 constitute an SCG. Also, the frequencies used in the cells are C1, C2, C3, C4 and C5, in ascending order.

In each CG, at least one cell is configured to be capable of PUCCH feedback. In FIG. 3A, C1, which is the PCell, is configured as the PUCCH-configurable cell of the MCG, and C3 is configured as the PUCCH-configurable cell of the SCG. That is, UCI feedback using the PUCCH of the MCG is sent in the PCell (C1), and UCI feedback using the PUCCH of the SCG is sent in the PUCCH-configurable SCell (C3). Note that, when uplink PUSCH transmission is commanded, the UE also can multiplex and transmit UCI on the PUSCH. That is, UCI feedback using the PUSCH is not limited to PUCCH-configurable cells.

Meanwhile, FIG. 3B is a diagram to show an example of PUCCH allocation to SCells in CA. As described above, from the perspective of allocating the PUCCH based on rules that are common between CA and DC, in CA, too, each radio base station configures a CG that is formed with one cell or a plurality of cells. Each CG is likely to be constituted with one or more cells that are formed by the same radio base station or with one or more cells that are formed by the same transmission point (transmitting antenna device, transmission station, etc.), but the actual operation is by no means limited to this. Hereinafter, the CG to include the PCell in CA will be referred to as the "XCG," and CGs other than the XCG will be referred to as "YCGs." Nevertheless, these names are by no means limiting. Also, a structure is employed here in which two or more cells can execute CA in each CG, but the total number of cells constituting the XCG and/or an YCG becomes equal to or less than a predetermined value (for example, five cells). This predetermined value may be determined in advance, or may be configured dynamically between eNBs and UEs.

The cell structure is the same as in FIG. 3A except that the XCG and the YCG in FIG. 3B correspond to the MCG and the SCG in FIG. 3A. In each CG, at least one cell is configured to be capable of PUCCH feedback. In FIG. 3B, C1, which is the PCell, is configured as the cell where the XCG's PUCCH can be allocated, and C3 is configured as the cell where the YCG's PUCCH can be allocated. That is, C1 and C3 are PUCCH-configurable cells, and the UCI feedback of the XCG is sent in the PCell (C1), and the UCI feedback of the YCG is sent in the PUCCH-configurable SCell (C3). Note that, when uplink PUSCH transmission is commanded, the UE can multiplex and transmit UCI on the PUSCH as well. That is, UCI feedback using the PUSCH is by no means limited to PUCCH-configurable cells.

Note that information about the PUCCH-configurable cells is reported from the radio base stations to the user terminal via higher layer signaling (for example, RRC signaling, broadcast signals, etc.). Also, information about the CGs may be reported via higher layer signaling as well. To be more specific, information about the cells or the CGs to feed back UCI via the PCell's PUCCH, or information about the cells or the CGs to feed back UCI via the SCell's PUCCH may be reported to the user terminal. For example, FIG. 3B shows an example case where configuration is provided so that, in CA, the PUCCH is transmitted in one SCell, in addition to the PCell, and UCI for two cells (that is, the XCG) is fed back in the PCell's PUCCH and UCI for three cells (that is, the YCG) is fed back in the SCell's PUCCH.

Now, in the radio communication systems of LTE Rel. 10 and later versions, cross-carrier scheduling (CCS) is introduced in CA, whereby DCI to pertain to cells that transmit/receive signals using a shared data channel (PDSCH/PUSCH) is reported via a control channel (PDCCH) that is allocated to another cell. For example, PDSCH/PUSCH transmission/receipt commands for a cell C2 can be sent in the PDCCH of a cell C1. By using CCS, it becomes possible to transmit/receive control signals by using the PCell or an SCell of high reliability among a plurality of cells. Note that CCS itself may be configured from higher layers and the cells to be scheduled by CCS are determined on a dynamic basis.

Figure 4B:
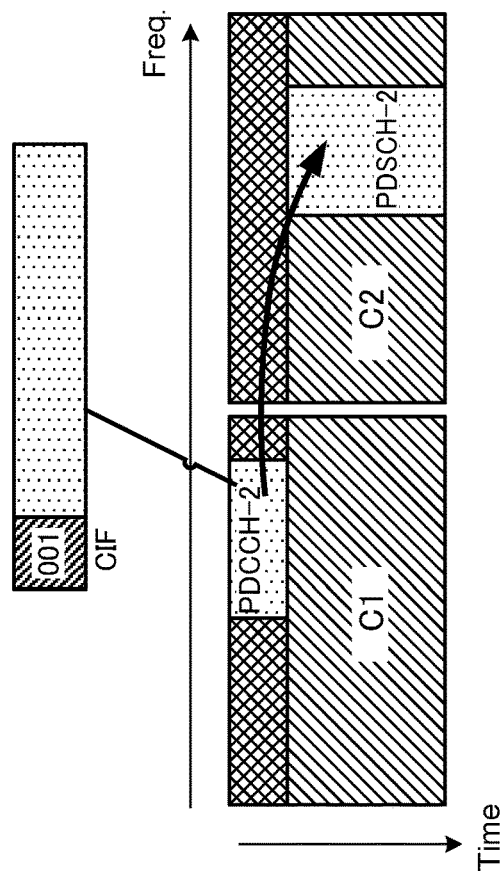
FIG. 4 provide diagrams to show examples of cross-carrier scheduling (CCS)
Figure 4A:
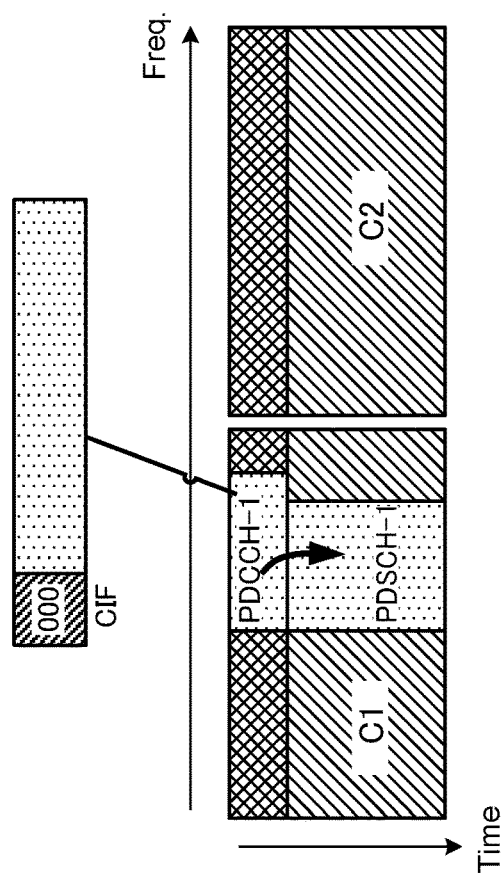

Examples of CCS will be described with reference to FIG. 4. In FIG. 4, a PDSCH-1 is allocated to cell C1, and a PDSCH-2 is allocated to another cell C2. A PDCCH-1, which provides control information for decoding PDSCH-1, is sent in the same C1 with PDSCH-1 (FIG. 4A). Meanwhile, a PDCCH-2, which provides control information for decoding PDSCH-2, is sent in C1, which is different from that of PDSCH-2 (FIG. 4B). Also, PDCCH-1 and PDCCH-2 each include a CIF (Carrier Indicator Field). The CIF is a bit field for configuring carrier indicators (CI), which specify the cells (CCs) to be scheduled in CCS, in DCI.

In DC, too, application of CCS is under study, as in CA. In CA, radio base stations (that is, CGs) are connected via an ideal backhaul, so that CCS to span over CGs can be configured. Meanwhile, in DC, CGs are connected via a non-ideal backhaul, and there is therefore a threat that CCS to so span over CGs does not work in an effective manner, due to delays. Here, CCS to span over CGs means CCS in which cells belonging to different CGs from the CG where the cell having received the PDCCH belongs. This, in other words, means CCS that is used when the cell to transmit/receive the PDCCH and the cell to demodulate the PDSCH by using this PDCCH (the cell specified in the CIF included in the PDCCH) belong to different CGs.

As described earlier, either in DC or in CA, a system to employ CCS and PUCCH on SCell at the same time may be possible. To be more specific, in DC, PUCCH on SCell is essential, and, furthermore, CCS may be employed for load balancing of the PDCCH. Also, although PUCCH on SCell is not essential in CA, there is nevertheless a possibility that PUCCH on SCell is configured for the purpose of allowing load balancing of the PUCCH, and there is a possibility that CCS is employed in order to allow load balancing of the PDCCH.

However, in CA or in DC, the operation for when CCS and PUCCH on SCell are employed at the same time have not been stipulated. To be more specific, when a user terminal detects a PDCCH to command CCS, the user terminal needs to transmit the PUCCH from at least one PUCCH-configurable cell, but nevertheless there is no stipulation as to which PUCCH-configurable cell should be used to transmit the PUCCH. Consequently, there is a threat that the understanding as to which cell should send UCI feedback in response to CCS might vary between the radio base stations and the user terminal and a decrease in overall system performance may be caused.

So, the present inventors have come up with the idea of adequately stipulating the operation for when CCS and PUCCH on SCell are configured in a system in which a plurality of radio base stations and user terminals communicate using CA or DC.

To be more specific, the present inventors have come up with the idea of implementing control so that, when a PDCCH to indicate CCS is detected, whether or not this CCS is going to be executed between cells belonging to the same CG is decided, and, based on this decision, at least one cell to transmit the PUCCH is selected, and the PUCCH is transmitted via this selected cell. According to this structure, the decrease of overall system performance can be reduced.

Now, a radio communication method according to an embodiment of the present invention (hereinafter referred to as "the present embodiment") will be described below in detail. With the present embodiment, when a user terminal detects a PDCCH that reports CCS, whether or not the cell where this PDCCH is received (the cell in which the user terminal receives the PDCCH) and the cell that is designated based on CCS belong to the same CG is decided. If the decision made above is true, it is possible to decide that this CCS is CCS that does not span over CGs (hereinafter, when it is mentioned that CCS does not span over CGs, this will mean that the cell to receive the PDCCH and the cell designated by the CCS belong to the same CG), and, if the decision made above is false, it is possible to decide that this CCS is CCS that spans over CGs (hereinafter, when it is mentioned that CCS spans over CGs, this will mean that the cell to receive the PDCCH and the cell designated by the CCS do not belong to the same CG).

Here, the decision as to whether the PDCCH-receiving cell and the cell designated based on CCS belong to the same CG can be made using, for example, the CIF. For example, the above decision is true if the cell having received a PDCCH in which a CIF is configured and the cell that is designated by the number included in the CIF belong to the same CG, and false if these cells belong to different CGs.

The radio communication method according to the present embodiment may be generally applied to the case where DC is employed in user terminals (referred to as an example 1) and the case where CA is employed in user terminals (referred to as an example 2). Now, each example will be described below in detail. Note that, hereinafter, the cell that transmits the PUCCH when a PDCCH to indicate CCS is detected will be referred to as the "PUCCH-transmitting cell."

EXAMPLE 1

In example 1 of the radio communication method according to the present embodiment, the allocation of the PUCCH in the event CCS and PUCCH on Scell are configured in DC is stipulated.

In example 1, when a PDCCH to report CCS that does not span over CGs is detected, the PUCCH-configurable cell in the CG where the PDCCH-receiving cell belongs is selected as the PUCCH-transmitting cell, and UCI is transmitted using this PUCCH-transmitting cell. To be more specific, if the CCS that is detected is CCS executed within the MCG, the user terminal selects the PCell as the PUCCH-transmitting cell. Also, if the CCS that is detected is CCS executed within an SCG, the user terminal selects the PUCCH-configurable SCell in that SCG as the PUCCH-transmitting cell. The UCI to feed back is acknowledgment response signals, including for example, positive acknowledgement (ACK: Acknowledgement), negative acknowledgement (NACK: Negative ACK) and so on, it is equally possible to feed back others (for example, channel quality information (CQI) and so on).

On the other hand, when a PDCCH to report CCS that spans over CGs is detected, the user terminal judges that this PDCCH is invalid. At this time, the user terminal selects the PUCCH-configurable cell in the CG where the PDCCH-receiving cell belongs as the PUCCH-transmitting cell, and either feeds back a NACK or executes discontinuous transmission (DTX). Here, DTX means not transmitting an ACK or a NACK and making no transmission in the timing to transmit feedback. Also, it is equally possible to transmit feedback information that matches none of ACK/NACK/DTX, and that means the decision the PDCCH is invalid.

Note that, when information to indicate a plurality of cross-carrier schedulings is included in a downlink control signal, the user terminal decides, for each cell that is designated by the information to indicate cross-carrier scheduling, whether this cell and the cell having received the downlink control signal belong to the same cell, and, based on these decisions, selects the PUCCH-transmitting cell from thee PUCCH-configurable cells. The same holds with example 2, which will be described later.

Figure 5B:
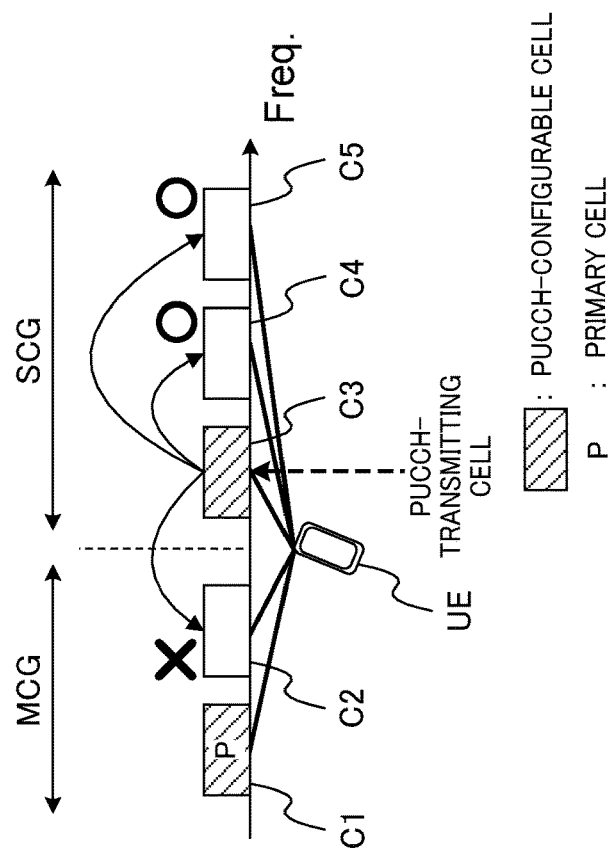
FIG. 5 provide diagrams to show examples of PUCCH allocation in the event CCS and PUCCH on Scell are configured in DC.
Figure 5A:
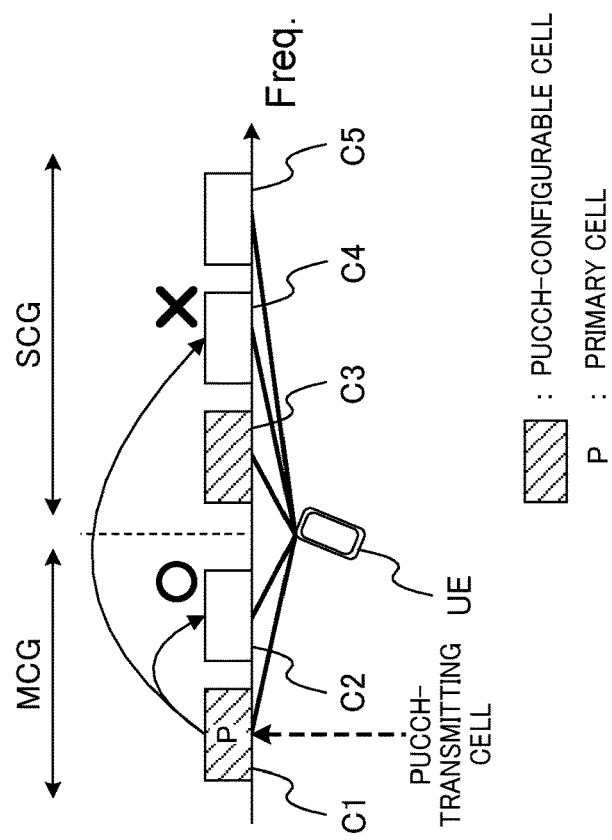

FIG. 5 provide diagrams to show examples of PUCCH allocation in the event CCS and PUCCH on Scell are configured in DC. FIG. 5 show arrows from the cells having detected information (CIF) to indicate CCS in the PDCCH to the cells that are scheduled using this information. FIG. 5A shows a case where the information which the UE has detected in the PDCCH of C1 is information to indicate CCS from C1 to C2 and C4. Also, FIG. 5B shows case where the information which the UE has detected in the PDCCH of C3 is information to indicate CCS from C3 to C2, C4 and C5.

Also, the cells that are subject to scheduling in FIG. 5 are assigned the symbol "○" when the scheduling is valid and the symbol "x" when the scheduling is invalid (scheduling which the user terminal judges valid is shown with "○," and scheduling which the user terminal judges invalid is shown with "x"). Also, in FIG. 5, the PUCCH-transmitting cells that are selected are shown with dotted arrows. These arrows and symbols carry the same meanings as in FIGS. 6 to 16, which will be described later.

In example 1, in the CCS from C1 to C2 in FIG. 5A, the cell (C1) that receives the PDCCH and the cell (C2) that is designated based on the CCS belong to the same CG (MCG), so that this PDCCH is valid, and C1 is selected as the PUCCH-transmitting cell. Also, in the CCS from C3 to C4 and C5 in FIG. 5B, the PDCCH-receiving cell (C3) and the cells (C4 and C5) that are designated based on the CCS belong to the same CG (SCG), so that this PDCCH is valid, and C3 is selected as the PUCCH-transmitting cell.

Meanwhile, in the CCS from C1 to C4 in FIG. 5A, the cell (C1) that receives the PDCCH and the cell (C4) that is designated based on the CCS belong to different CGs, and therefore the UE judges this PDCCH invalid and does not decode the PDSCH. Also, the UE either transmits a NACK in C1 or executes DTX. Also, in the CCS from C3 to C2 in FIG. 5B, the PDCCH-receiving cell (C3) and the cell (C2) that is designated based on the CCS belong to different CGs, and therefore the UE judges this PDCCH invalid, and either transmits a NACK in C3 or executes DTX.

Note that the number of CIF bits is usually three bits, but this may be reduced to two bits in example 1 when the maximum number of cells in DC is configured to five cells as mentioned earlier. In this case, the maximum number of cells in a CG that can execute CA is four cells, and therefore two bits suffice for the CIF. By reducing the number of CIF bits, it is possible to lower the coding rate of DCI messages, and, as a result of this, improve the quality of communication. In other words, it is possible to lower the DCI aggregation level and reduce the overhead of the PDCCH.

Also, when three or more cells in a CG execute CA, CCS from cells apart from the PUCCH-configurable cell may be used. That is, the PDCCH-receiving cell and the PUCCH-configurable cells may vary. To be more specific, CCS from a cell other than the PCell in the MCG and from a cell other than the PUCCH-configurable SCell in an SCG may be configured. In this case, as the PUCCH-transmitting cell, the UE selects the PCell if the PDCCH-transmitting cell is a cell within the MCG, or selects the PUCCH-configurable SCell if the PDCCH-transmitting cell is a cell within the SCG. By this means, it is possible to separate the PUCCH cell and the cell to receive the PDCCH, so that even more flexible load balancing of control signals is made possible.

Also, in SCGs, it is possible not to support CCS from a cell apart from the PUCCH-configurable cell to the PUCCH-configurable cell (judges invalid). This is the same as not supporting CCS from an SCell to the PCell in CA. By this means, looking at SCGs alone, the same rules as in CCS in CA are employed, so that it is possible to use the CCS algorithm in CA, and reduce the load of implementation, the increase of cost and so on.

Figure 6:
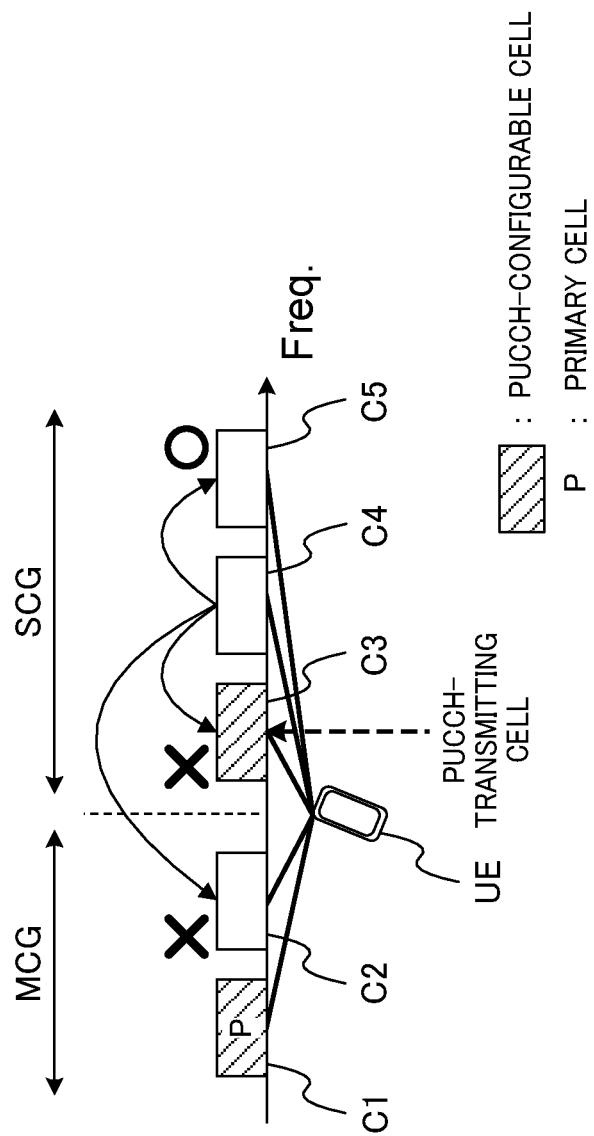
FIG. 6 is a diagram to show an example of PUCCH allocation in the event CCS and PUCCH on Scell are configured in DC.

FIG. 6 is a diagram to show an example of PUCCH allocation in the event CCS and PUCCH on Scell are configured in DC. FIG. 6 shows a case where three cells in an SCG execute CA, and information (CIF) to indicate CCS from C4 to C2, C3 and C5 is included in the PDCCH of C4, which is not the PUCCH-configurable cell. Note that the description of FIG. 6 will assume that, when three or more cells in a CG execute CA, CCS from cells (C4 and C5) apart from the PUCCH-configurable cell is allowed, while, in the SCG, CCS from cells (C4 and C5) apart from the PUCCH-configurable cell to the PUCCH-configurable cell (C3) is not supported.

In this case, CCS from C4 to C5 is valid, and the PUCCH is transmitted in C3. Also, CCS from C4 to C2 is not CCS to a cell that is included in the CG (SCG) where the PDCCH-receiving cell (C4) belongs, and therefore this PDCCH is judged invalid, and either a NACK is transmitted in C3 or DTX is executed. Also, CCS from C4 to C3 is CCS from a cell apart from the PUCCH-configurable cell to the PUCCH-configurable cell in the SCG, so that this PDCCH is judged invalid, and either a NACK is transmitted in C3 or DTX is executed.

As described above, according to example 1 of the radio communication method of the present embodiment, when CCS and PUCCH on SCell are configured in a radio communication system in which DC is employed, whether or not the cell where a PDCCH to indicate CCS is received and the cell that is designated based on the CCS belong to the same CG is decided, and the cell to transmit the PUCCH is selected based on this decision. Also, CCS that is determined to span over CGs is judged invalid. By employing such configurations, it is possible to judge CCS in combinations of scheduling cells/scheduled cells that are not possible in DC invalid, thereby skipping unnecessary decoding operations in user terminals, and reducing the consumption of power. Also, by making CCS in the same cell group (in the MCG or in an SCG) valid, in DC, too, it is possible to realize inter-cell interference control with respect to the PDCCH, secure quality, and so on.

Note that when CCS is judge invalid and DTX is executed, or when feedback to mean that a PDCCH is judged invalid is sent, it is possible to improve the performance of HARQ. According to above-described example 1, when CCS is judged invalid, a user terminal does not decode the PDSCH. Consequently, the base station decides that the user terminal has failed to receive the PDSCH, and retransmits the PDSCH. If a NACK is fed back, the base station transmits a different bit sequence from that of initial transmission, among encoded bit sequences, in order to improve the coding gain by HARQ. However, if the user terminal does not decode the PDSCH, transmitting a different bit sequence from that of initial transmission achieves no coding gain. Instead, greater retransmission gain may be achieved by transmitting the initial transmission bit sequence, which may contain more information bit sequences prior to coding. In this way, by sending feedback that means DTX and invalid decisions instead of sending NACKs, the base station can retransmit the initial transmission bit sequence. so that it is possible to improve the effect of HARQ.

EXAMPLE 2

Example 2 of the radio communication method according to the present embodiment stipulates the allocation of the PUCCH in the event CCS and PUCCH on Scell are configured in CA. Note that example 2 will assume that each radio base station configures a CG that is formed with one cell or a plurality of cells, and each CG is configured so that at least one cell is capable of PUCCH feedback. Also, although the CG to include the PCell will be referred to as the "XCG" and CGs other than the XCG will be referred to as "YCGs," these names are by no means limiting.

In example 2, when a user terminal detects a PDCCH to report CCS that does not span over CGs, the user terminal selects the PUCCH-transmitting cell from the CG where the PDCCH-receiving cell belongs, as in example 1. To be more specific, the user terminal makes the PCell the PUCCH-transmitting cell if the CCS that is detected indicates CCS within the XCG. Also, the user terminal makes the PUCCH-configurable SCell the PUCCH-transmitting cell if the CCS that is detected indicates CCS within a YCG.

Figures 7A, 7B:
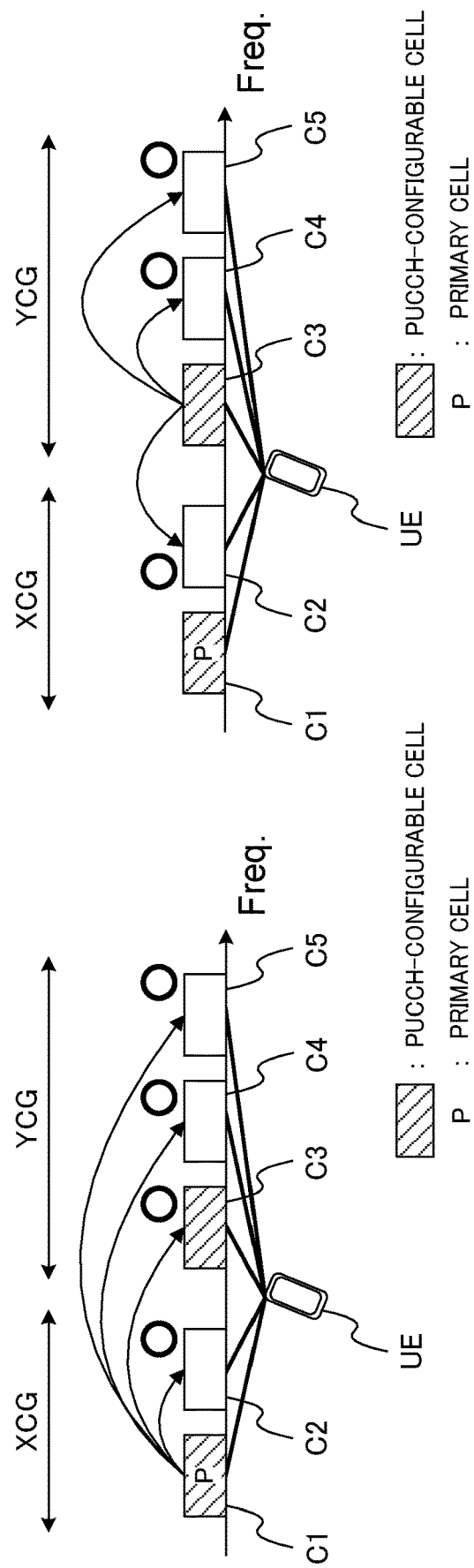
FIG. 7 provide diagrams to show examples of whether or not CCS is valid when the PUCCH is allocated to SCells in CA.

Also, even when the user terminal detects a PDCCH to report CCS that spans over CGs, unlike example 1, the user terminal can judge the CCS valid. FIG. 7 provide diagrams to show examples of whether or not CCS is valid when the PUCCH is allocated to SCells in CA. FIG. 7A shows a case where the information which the UE has detected in the PDCCH of C1 is information to indicate CCS from C1 to C2, C3, C4 and C5. Also, in FIG. 7B shows case where the information which the UE has detected in the PDCCH of C3 is information to indicate CCS from C3 to C2, C4 and C5. In example 2, CCS is valid whether or not it spans over CGs.

In example 2, if the user terminal detects a PDCCH to report CCS that spans over CGs, the PUCCH-transmitting cell is selected according to one of the following two rules (example 2.1 and example 2.2). Note that, when the following description mentions example 2, this will cover both example 2.1 and example 2.2.

In example 2.1, when a PDCCH to report CCS that spans over CGs is detected, the PUCCH-configurable cell that is included in the CG where the cell having received the PDCCH belongs is selected as the PUCCH-transmitting cell, as in the case of CCS that does not span over CGs. To be more specific, if the PDCCH is received in a cell belonging to the XCG, the PCell is made the PUCCH-transmitting cell, whereas, if the PDCCH is received in a cell belonging to a YCG, the PUCCH-configurable SCell is made the PUCCH-transmitting cell. This allows the PDCCH and the PUCCH to be configured in the same cell, so that it is possible to off-load the data and maintain the quality of control signals by applying cell design to secure the quality of communication and coverage to the cell where the PDCCH and the PUCCH are configured (for example, making this cell the macro cell), and by configuring other cells so as to make the cell radius smaller, reduce the number of user terminals to be accommodated in one cell at the same time, and so on (for example, making these cells small cells).

On the other hand, in example 2.2, when a PDCCH to report CCS that spans over CGs is detected, the PUCCH-configurable cell included in the CG where the cell to receive the PDSCH belongs (the cell that is designated to decode the PDSCH based on this CCS) is selected as the PUCCH-transmitting cell. To be more specific, if the PDSCH is received in a cell belonging to the XCG, the PCell is made the PUCCH-transmitting cell, whereas, if the PDSCH is received in a cell belonging to a YCG, the PUCCH-configurable SCells is made the PUCCH-transmitting cell. By this means, it is possible to improve the off-loading effect both on the uplink and the downlink. For example, the operation switch between and designate cells where the traffic is light (for example, small cells), including the cells where the downlink PDSCH and the uplink PUCCH are transmitted and received, while configuring the PDCCH in a cell that is designed to maintain the quality of communication and coverage (for example, the macro cell) on a fixed basis, may become possible.

Now, the selection of PUCCH-transmitting cells in example 2 will be described in detail with reference to FIGS. 8 to 16. Note that, as shown in the drawings, the schedulings shown with respect to the CCSs of FIGS. 8 to 16 are all judged valid.

Figure 8B:
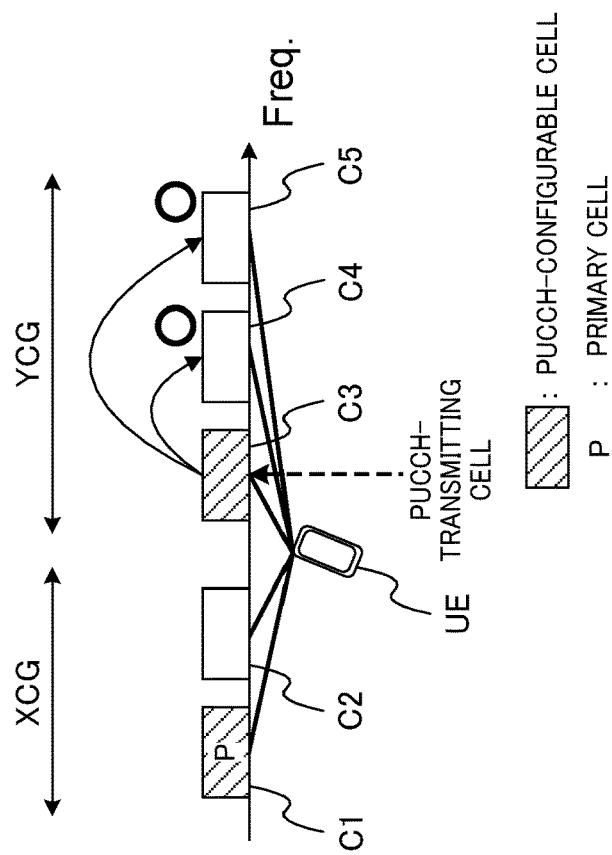
FIG. 8 provide diagrams to show examples of PUCCH-transmitting cells that are selected by a user terminal according to an embodiment of the present invention when a PDCCH to report CCS that does not span over CGs is detected.
Figure 8A:
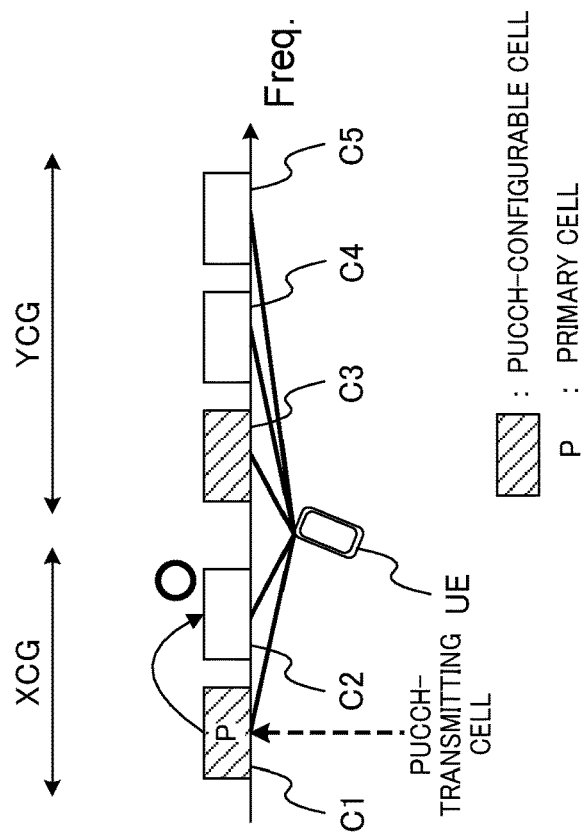

FIG. 8 provide diagrams to show examples of PUCCH-transmitting cells where a user terminal has detected a PDCCH to report CCS that does not span over CGs. FIG. 8A shows a case where the information which the UE has detected in the PDCCH of C1 is information to indicate CCS from C1 to C2. Also, FIG. 8B shows a case where the information which the UE has detected in the PDCCH of C3 is information to indicate CCS from C3 to C4 and C5.

The CCS from C1 to C2 in FIG. 8A is CCS to a cell that is included in the CG (XCG) where the PDCCH-receiving cell (C1) belongs, so that C1 is selected as the PUCCH-transmitting cell. Also, the CCS from C3 to C4 and C5 in FIG. 8B is CCS to a cell that is included in the CG (YCG) where the PDCCH-receiving cell (C3) belongs, so that C3 is selected as the PUCCH-transmitting cell.

Figure 9A:
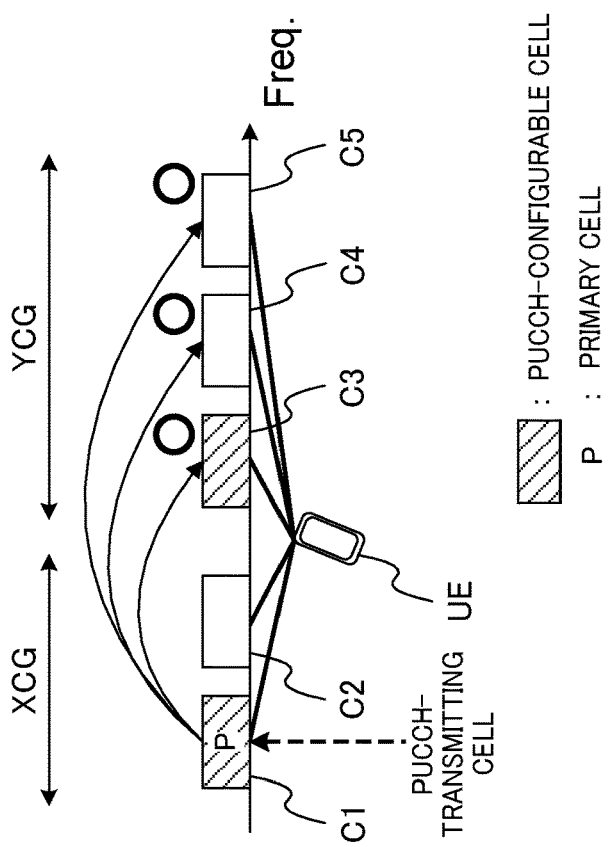
FIG. 9 provide diagrams to show examples of PUCCH-transmitting cells that are selected by a user terminal according to an example 2.1 of an embodiment of the present invention.
Figure 9B:
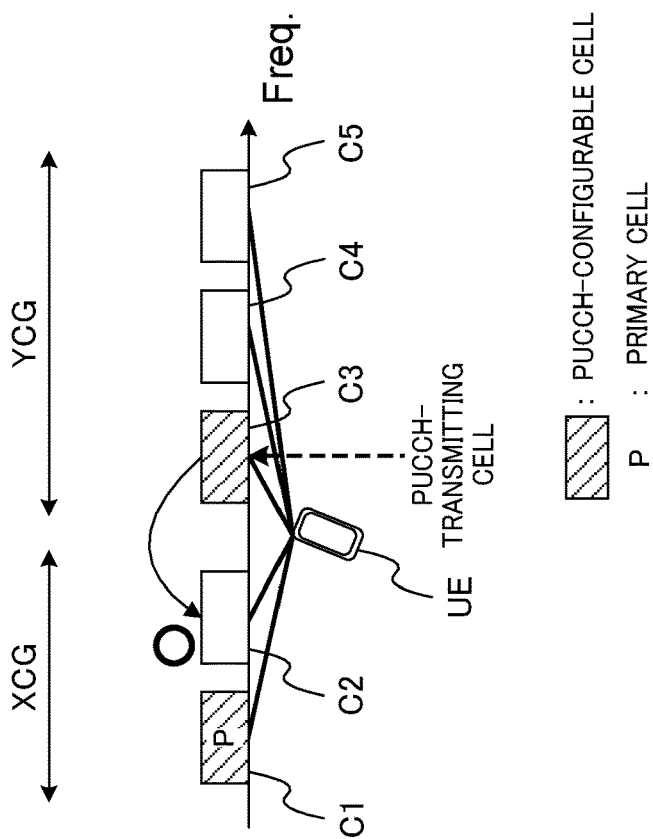

Next, the selection of PUCCH-transmitting cells according to example 2.1 and example 2.2 will be described. FIG. 9 provide diagrams to show examples of PUCCH-transmitting cells that are selected by a user terminal, according to example 2.1, when a PDCCH to report CCS that spans over CGs is detected. FIG. 9A shows a case where the information which the UE has detected in the PDCCH of C1 is information to indicate CCS from C1 to C3, C4 and C5. Also, FIG. 9B shows a case where the information which the UE has detected in the PDCCH of C3 is information to indicate CCS from C3 to C2.

In FIG. 9A, the PDCCH-receiving cell (C1) having detected the CCS is selected as the PUCCH-transmitting cell. Also, in FIG. 9B, the PDCCH-receiving cell (C3) having detected the CCS is selected as the PUCCH-transmitting cell.

Figures 10A, 10B:
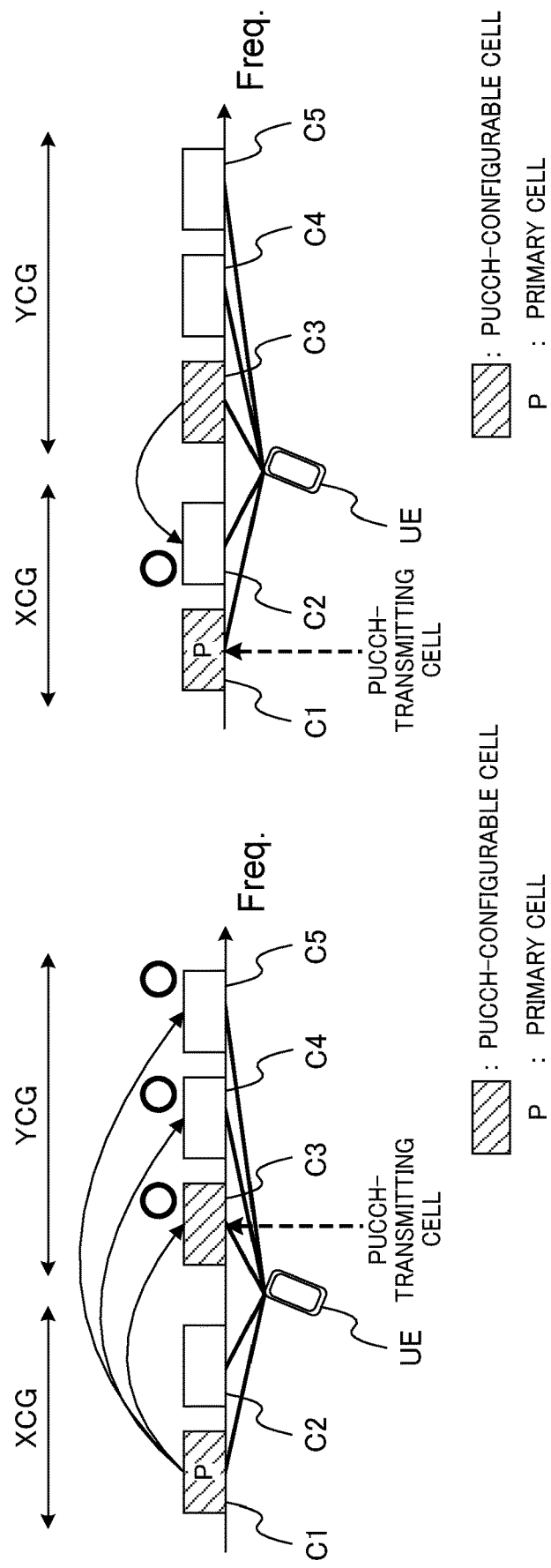
FIG. 10 provide diagrams to show examples of PUCCH-transmitting cells that are selected by a user terminal according to an example 2.2 of an embodiment of the present invention.

FIG. 10 provide diagrams to show examples of PUCCH-transmitting cells that are selected by a user terminal, according to example 2.2, when a PDCCH to report CCS that spans over CGs is detected. The information to represent CCS in FIG. 10A and FIG. 10B is the same as in the cases illustrated FIG. 9A and FIG. 9B.

In FIG. 10A, C3, C4 and C5, which are scheduled by CCS, receive the PDSCH. Also, C3 to C5 all belong to the YCG. Consequently, C3, which is the PUCCH-configurable cell in the YCG, is selected as the PUCCH-transmitting cell. On the other hand, in FIG. 10B, C2, which is scheduled by CCS, receive the PDSCH. Also, C2 belong to the XCG. Consequently, C1, which is the PUCCH-configurable cell in the XCG, is selected as the PUCCH-transmitting cell.

Now, cases in which the XCG and the YCG are both formed with one cell (that is, case of two-cell CA) will be described as the simplest examples of example 2.1 and example 2.2. Assume that the PCell and the SCell are both PUCCH-configurable cells, and CCS is configured. In this case, CCS to other cells has always to be carried out across CGs.

Figures 11A, 11B:
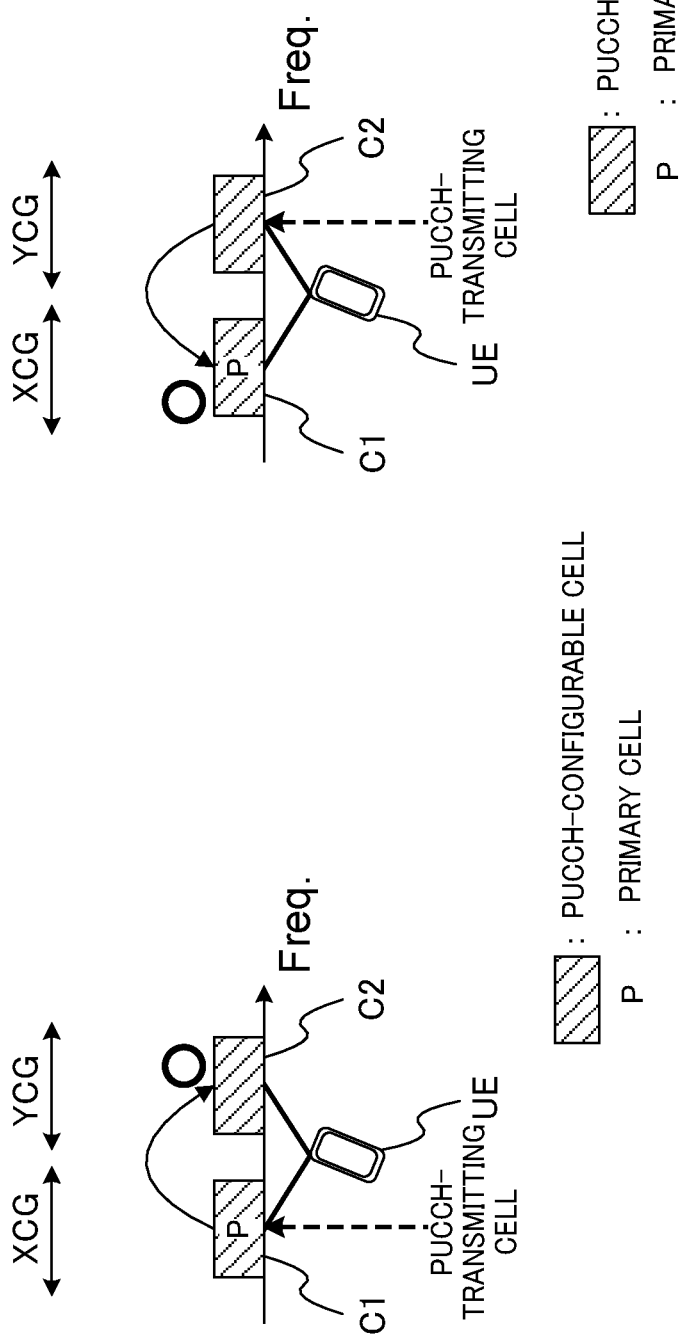
FIG. 11 provide diagrams to show examples of PUCCH-transmitting cells that are selected according to example 2.1 of an embodiment of the present invention in the event of two-cell CA.

FIG. 11 show examples of PUCCH-transmitting cells that are selected by a user terminal, according to example 2.1, when a PDCCH to report CCS is detected in the event of two-cell CA. C1 is the PCell, and C2 is an SCell. Also, C1 constitutes the XCG, and C2 constitutes a YCG. Also, the frequencies used in the cells are C1 and C2, in ascending order. FIG. 11A shows a case where the information which the UE has detected in the PDCCH of C1 is information to indicate CCS from C1 to C2. Also, FIG. 11B shows a case where the information which the UE has detected in the PDCCH of C2 is information to indicate CCS from C2 to C1.

In example 2.1, the user terminal transmits the PUCCH in the cell where the PDCCH has been received (the cell to be scheduled based on the CIF). That is, in FIG. 11A, the PDCCH-receiving cell (C1) having detected CCS is selected as the PUCCH-transmitting cell. Also, in FIG. 11B, the PDCCH-receiving cell (C2) having detected CCS is selected as the PUCCH-transmitting cell. In this way, according to example 2.1, it is possible to gather uplink and downlink L1/L2control signals in a cell of high reliability.

Figure 12B:
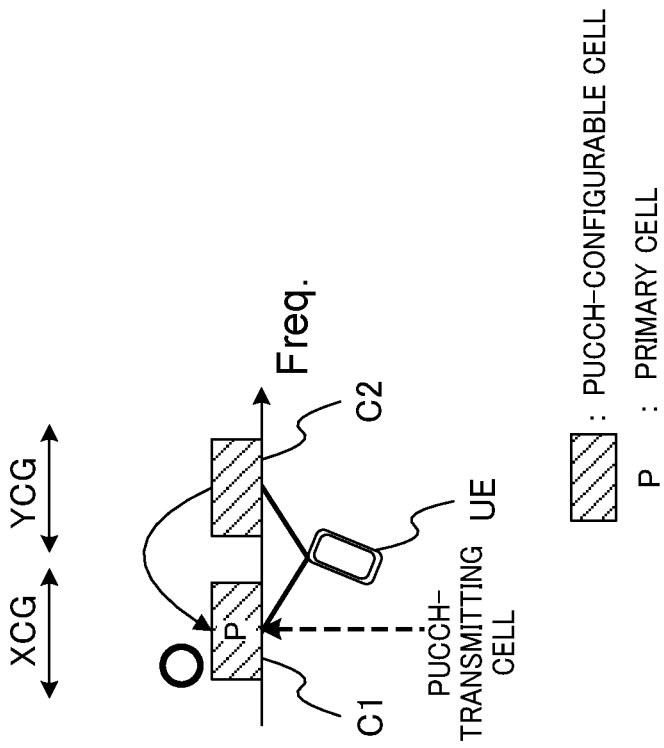
FIG. 12 provide diagrams to show examples of PUCCH-transmitting cells that are selected according to example 2.2 of an embodiment of the present invention in the event of two-cell CA.
Figure 12A:
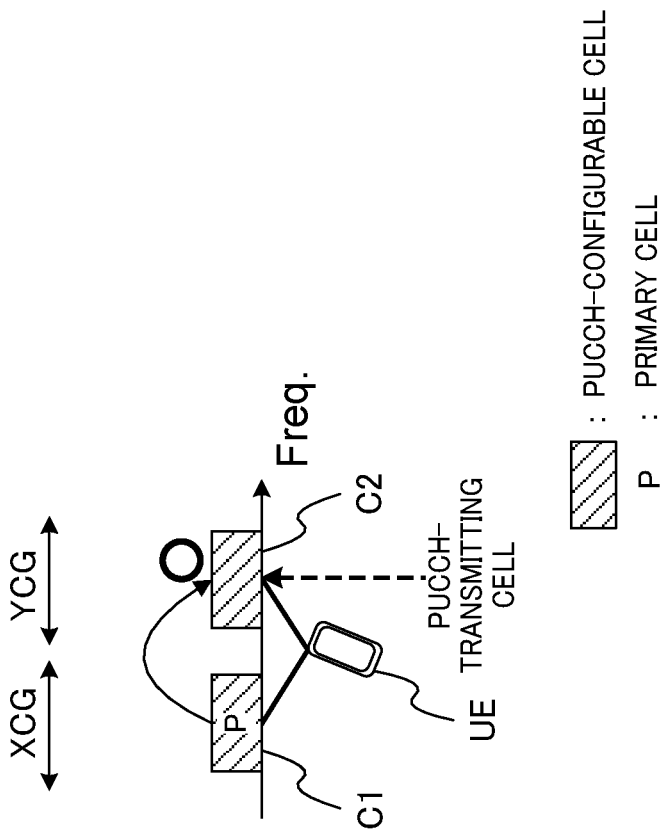

FIG. 12 show examples of PUCCH-transmitting cells that are selected by a user terminal, according to example 2.2, when a PDCCH to report CCS is detected in the event of two-cell CA. The information to indicate CCS and the cell structure in FIG. 12A and FIG. 12B are the same as in the cases illustrated in FIG. 11A and FIG. 11B.

In example 2.2, the user terminal transmits the PUCCH in the cell where the PDSCH is received (the cell to be scheduled based on the CIF). That is, in FIG. 12A, the cell (C2) to receive the PDSCH is selected as the PUCCH-transmitting cell. Also, in FIG. 12B, the cell (C1) to receive the PDSCH is selected as the PUCCH-transmitting cell. In this way, according to example 2.2, it is possible to off-load the PUCCH, in accordance with the off-loading of the PDSCH.

(When CCS to Span Over CGs and CCS not to Span Over CGs Occur at the Same Time in CA)

Figure 13A:
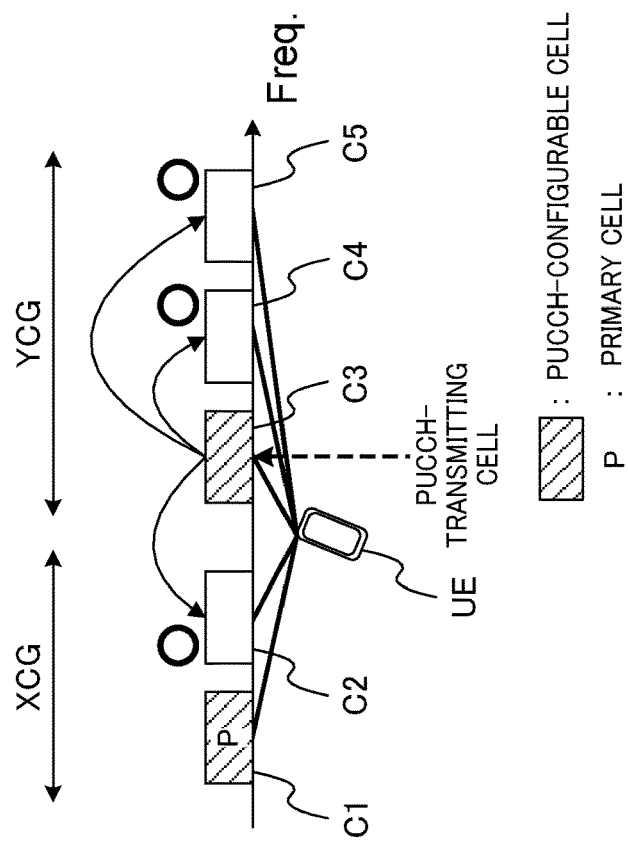
FIG. 13 provide diagrams to show examples of PUCCH-transmitting cells that are selected by a user terminal according to example 2.1 of an embodiment of the present invention when a PDCCH to report CCS that spans over CGs and CCS that does not span over CGs at the same time is detected.
Figure 13B:
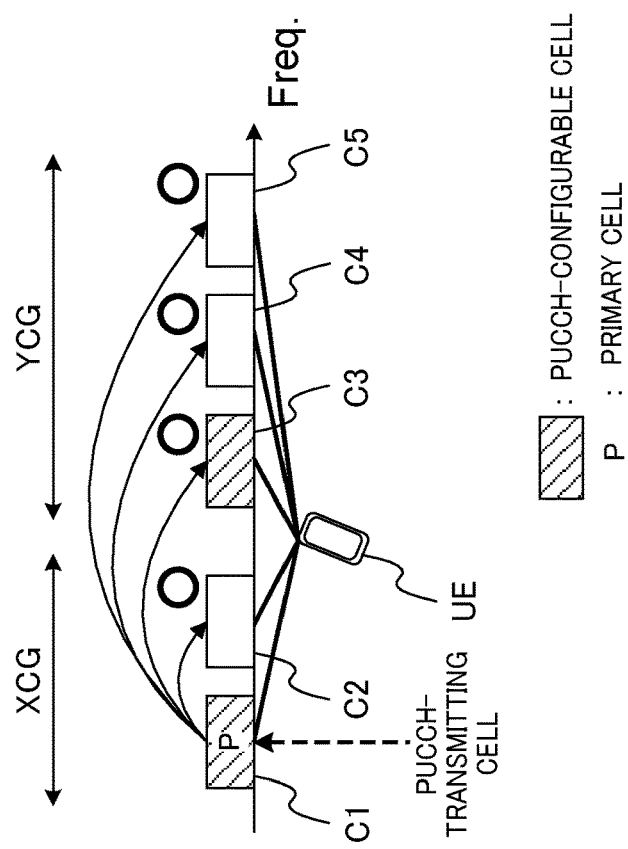

Next, the selection of PUCCH-transmitting cells according to example 2.1 and example 2.2 in the event CCS that spans over CGs and CCS that does not span over CGs occur at the same time will be described. FIG. 13 provide diagrams to show examples of PUCCH-transmitting cells that are selected by a user terminal, according to example 2.1, when a PDCCH to report CCS that spans over CGs and CCS that does not span over CGs at the same time is detected. FIG. 13A shows a case where the information which the UE has detected in the PDCCH of C1 is information to indicate CCS from C1 to C2, C3, C4 and C5. Also, FIG. 13B shows a case where the information which the UE has detected in the PDCCH of C3 is information to indicate CCS from C3 to C2, C4 and C5.

In FIG. 13A, the PDCCH-receiving cell (C1) having detected CCS is selected as the PUCCH-transmitting cell. Also, in FIG. 13B, the PDCCH-receiving cell (C3) having detected CCS is detected as the PUCCH-transmitting cell. As clear from the above description, in the event of example 2.1, even when CCS that spans over CGs and CCS that does not span over CGs are executed at the same time, one cell is detected as the PUCCH-transmitting cell.

FIG. 14 provide diagrams to show examples of PUCCH-transmitting cells that are selected by a user terminal, according to example 2.2, when a PDCCH to report CCS that spans over CGs and CCS that does not span over CGs at the same time is detected. The information to indicate CCS and the cell structure in FIG. 14A and FIG. 14B are the same as in the cases illustrated in FIG. 13A and FIG. 13B.

In FIG. 14A, C2, C3, C4 and C5, which are scheduled based on CCS, receive the PUSCH. Also, C2 belongs to the XCG, and C3 to C5 belong to a YCG. Consequently, two PUCCH-transmitting cells—namely, C1, which is the PUCCH-configurable cell in the XCG, and C3, which is the PUCCH-configurable cell in the YCG—are selected.

In FIG. 14B, C2, C4 and C5, which are scheduled based on CCS, receive the PUSCH. Also, C2 belongs to the XCG, and C4 and C5 belong to the YCG. Consequently, two PUCCH-transmitting cells—namely C1, which is the PUCCH-configurable cell in the XCG, and C3, which is the PUCCH-configurable cell in the YCG—are selected.

As clear from the above, in the event of example 2.2, if CCS that spans over CGs and CCS that does not span over CGs occur at the same time, two cells can transmit the PUCCH. Note that, in this case, a structure to transmit the PUCCH from only one of the two cells may be employed as well.

(When there are Three or More CGs in CA)

Figure 15B:
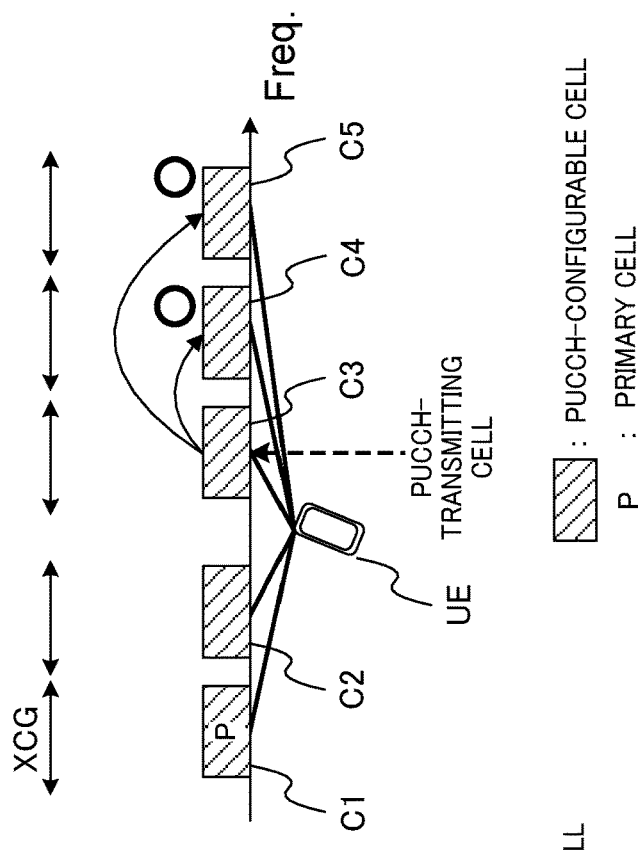
FIG. 15 provide diagrams to show examples of PUCCH-transmitting cells that are selected by a user terminal according to example 2.1 of an embodiment of the present invention when each CG is formed with one cell and CA is comprised of five CGs.
Figure 15A:
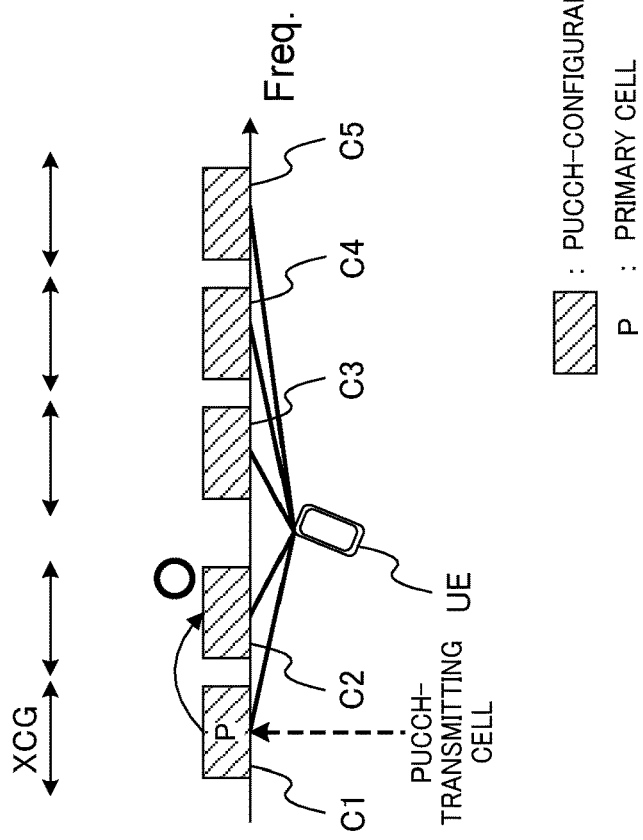

In CA, there may be three or more PUCCH-configurable cells. In other words, there may be three or more CGs. Also, each CG may be formed with one cell. FIG. 15 provide diagrams to show examples of PUCCH-transmitting cells that are selected by a user terminal, according to example 2.1, when each CG is formed with one cell, CA is comprised of five CGs and a PDCCH to report CCS is detected. C1 is the PCell, and C2 to C5 are SCells. Also, C1 constitutes the XCG, and C2 to C5 each constitute a different CG. Also, the frequencies used in the cells are C1, C2, C3, C4 and C5, in ascending order. FIG. 15A shows a case where the information which the UE has detected in the PDCCH of C1 is information to indicate CCS from C1 to C2. Also, FIG. 15B shows a case where the information which the UE has detected in the PDCCH of C3 is information to indicate CCS from C3 to C4 and C5.

In example 2.1, the UE transmits the PUCCH via the cell having received the PDCCH in which a CIF is configured. That is, as the PUCCH-transmitting cell, the UE selects C1 in FIG. 15A and selects C3 in FIG. 15B.

Figure 16A:
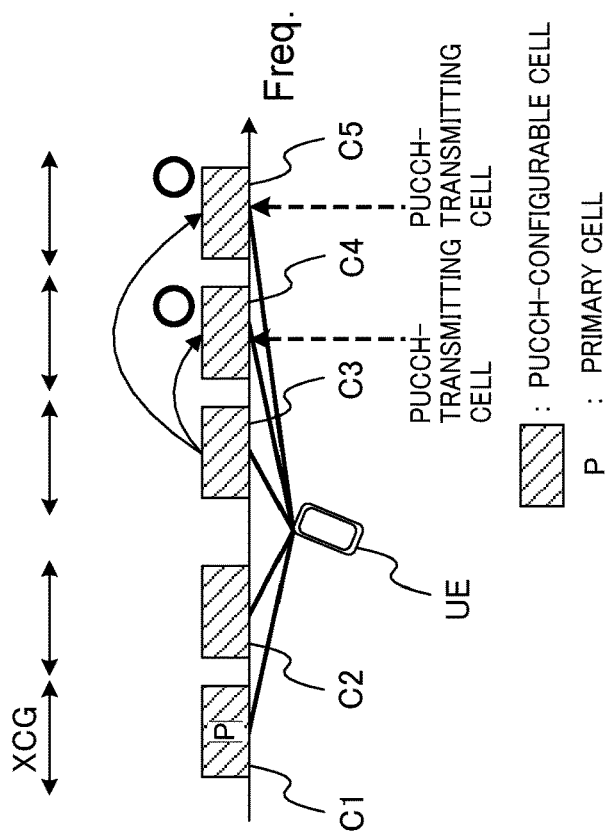
FIG. 16 provide diagrams to show examples of PUCCH-transmitting cells that are selected by a user terminal according to example 2.2 of an embodiment of the present invention when each CG is formed with one cell and CA is comprised of five CGs.
Figure 16B:
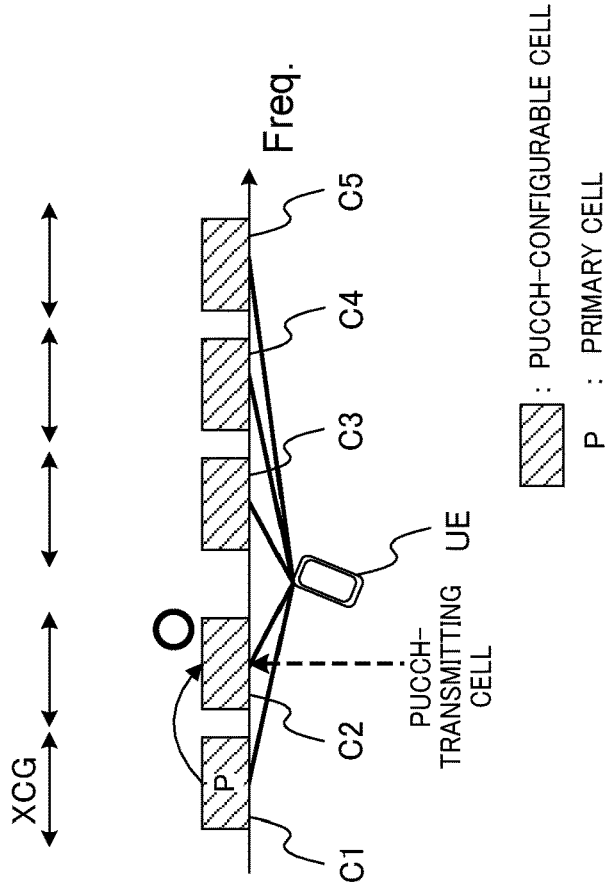

FIG. 16 provide diagrams to show examples of PUCCH-transmitting cells that are selected by a user terminal, according to example 2.2, when each CG is formed with one cell, CA is comprised of five CGs and a PDCCH to report CCS is detected. The information to indicate CCS and the cell structure in FIG. 16A and FIG. 16B are the same as in the cases illustrated in FIG. 15A and FIG. 15B.

In example 2.2, the UE transmit the PUCCH via cells that are scheduled based on CIF. That is, as the PUCCH-transmitting cell, the UE selects C2 in FIG. 16 and selects C4 and C5 in FIG. 16B. Note that, in FIG. 16B, the UE may be structured to transmit the PUCCH using one of C4 and C5.

As described above, with example 2 of the radio communication method according to the present embodiment, when CCS and PUCCH on SCell are configured in a radio communication system in which CA is employed, the cell having received a PDCCH signal indicating CCS and the cell that is designated based on the CCS belong to the same CG is decided, and the PUCCH-transmitting cell is selected base on this decision. If the decision is true, the PUCCH-configurable cell in the same CG as that of the cell having detected the CCS is selected as the PUCCH-transmitting cell. Also, if the decision is false, either the same might hold as when the decision is true, or the PUCCH-configurable cell in the CG where the cells that are scheduled based on the CCS belong is selected as the PUCCH-transmitting cell. By means of this structure, it is possible to off-load the data and maintain the quality of control signals even in the event of CA.

(Recognition of DC and CA in User Terminals)

Note that the user terminal may be structured to recognize whether DC is applied or CA is applied to the subject terminal based on information regarding application of DC that is reported from the network (for example, a radio base station, a higher control station and so on). This information may be information to indicate that an MCG and an SCG are configured. In this case, the user terminal can recognize that DC is applied between the MCG and the SCG that are configured. Also, the information to indicate the configuration of the SCG may include information that relates to the PUCCH-configurable cell in the SCell.

Also, the information regarding application of DC may be information to indicate whether the architecture of CA is used or the architecture of DC is used, and so on. The CA architecture separates the U-plane in the MAC layer while the DC architecture separates the U-plane in a higher layer than the MAC layer, so that whether or not DC is applied to the subject terminal can be recognized based on information that indicates the architecture to be used.

Also, the information regarding application of DC may be information as to whether or not an ideal backhaul to produce little delay such as optical fiber is used between predetermined cells or CGs. As described above, DC presumes that connections are established by means of a non-ideal backhaul, so that the user terminal can recognize whether or not DC is applied to the subject terminal based on information regarding backhaul.

Also, the information regarding application of DC may be a direct piece of information as to whether DC is used or CA is used between predetermined cells or CGs. By this means, recognition can be made easily compared to other pieces of information.

Also, the user terminal may be structured to recognize whether CA is applied or DC is applied to the subject terminal based on information regarding application of CA that is reported from the network (for example, a radio base station, a higher control station and so on). The information regarding application of CA may be, for example, the same as the above information regarding application of DC.

(Variations of CIF)

Note that example 1 and example 2 may be structured to associate the PUCCH-transmitting cell with the CIF to use in CCS. To be more specific, a structure may be employed in which the cell to transmit the uplink control signals of the cell designated base on the CIF and the PUCCH-transmitting cell are associated with each other. FIG. 17 provide diagrams to show examples of CIFs that are structured to be associated with the PUCCH-transmitting cell when CA is applied. FIG. 17 show CIFs where CA is carried out in one primary cell (PCell) and four secondary cells (SCell (1), SCell (2), SCell (3) and SCell (4)). Also, in FIG. 17, the element "PUCCH-transmitting cell" and the CIF values 5 to 7 are pieces of information that are associated new, unlike conventional CIFs, and are configured in advance by, for example, commands from higher layers such as RRC signaling, broadcast signals and so on.

In FIG. 17A, each CIF value designates a PDSCH-receiving cell (the cell to be scheduled based on CSS) and a PUCCH-transmitting cell. Conventional CIFs have supported maximum five cells and designated only the PDSCH-receiving cells of the CIF values 0 to 4 shown in FIG. 17. Also, heretofore, CA has not been designed to transmit the PUCCH in SCells, and so the PCell has been implicitly made the PUCCH-transmitting cell. By contrast with this, in FIG. 17A, an SCell (2) is configured to be the PUCCH-transmitting cell when the CIF value is 2 to 4.

Also, in FIG. 17B, only those CIF values that are not in use designate the PDSCH-receiving cell and the PUCCH-transmitting cell. The CIF values 5 to 7, which are not used in conventional CA that supports maximum five cells, designate the PDSCH-receiving cell and the PUCCH-transmitting cell.

As shown in FIG. 17A and FIG. 17B, by employing a structure in which the CIF in downlink control information is configured in combination with information pertaining to the PDSCH-receiving cell and the PUCCH-transmitting cell (joint coding), it is possible to use the conventional CIF and designate PUCCH-transmitting cells flexibly and dynamically. Note that the association of information pertaining to the PDSCH-receiving cell and the PUCCH-transmitting cell with the CIF is not limited to the configurations shown in FIG. 17, and, for example, other bit structures may be used as well.

(Capability Signaling)

Furthermore, with the present embodiment, a user terminal can report capability signaling regarding the subject terminal's capability for communication, to radio base stations, in advance, as shown below. For example, a combination of cells (CC combination) to enable downlink CA (DL-CA), a combination of cells to enable uplink CA (UL-CA), and so on are reported. The base stations determine CA or DC, or the combination of cells therein, based on the capability signaling reported from the user terminal, and configure these in the user terminal.

Also, the user terminal may report a combination of cells that enables CCS on the downlink, as capability signaling. Also, uplink cells (UL-CCs) to serve as PUCCH-configurable cells among SCells may be reported. Also, when CCS is carried out, the UL-CCs to serve as PUCCH-configurable cells among the SCells—that is, a subset of UL-CCs that serve as PUCCH-configurable cells among the SCells—may be reported. Also, when an SCell is designated a PUCCH-configurable cell, the combination of cells capable of downlink CCS—that is, a subset of the combination of cells capable of downlink CCS—may be reported. By using capability signaling such as that described above, the radio base stations can adequately configure CCS and PUCCH on SCell in the user terminal.

(Structure of Radio Communication System)

Now, an example of a radio communication system according to the present embodiment will be described in detail below. Note that the same components will be assigned the same codes, and overlapping description will be omitted.

Figure 18:
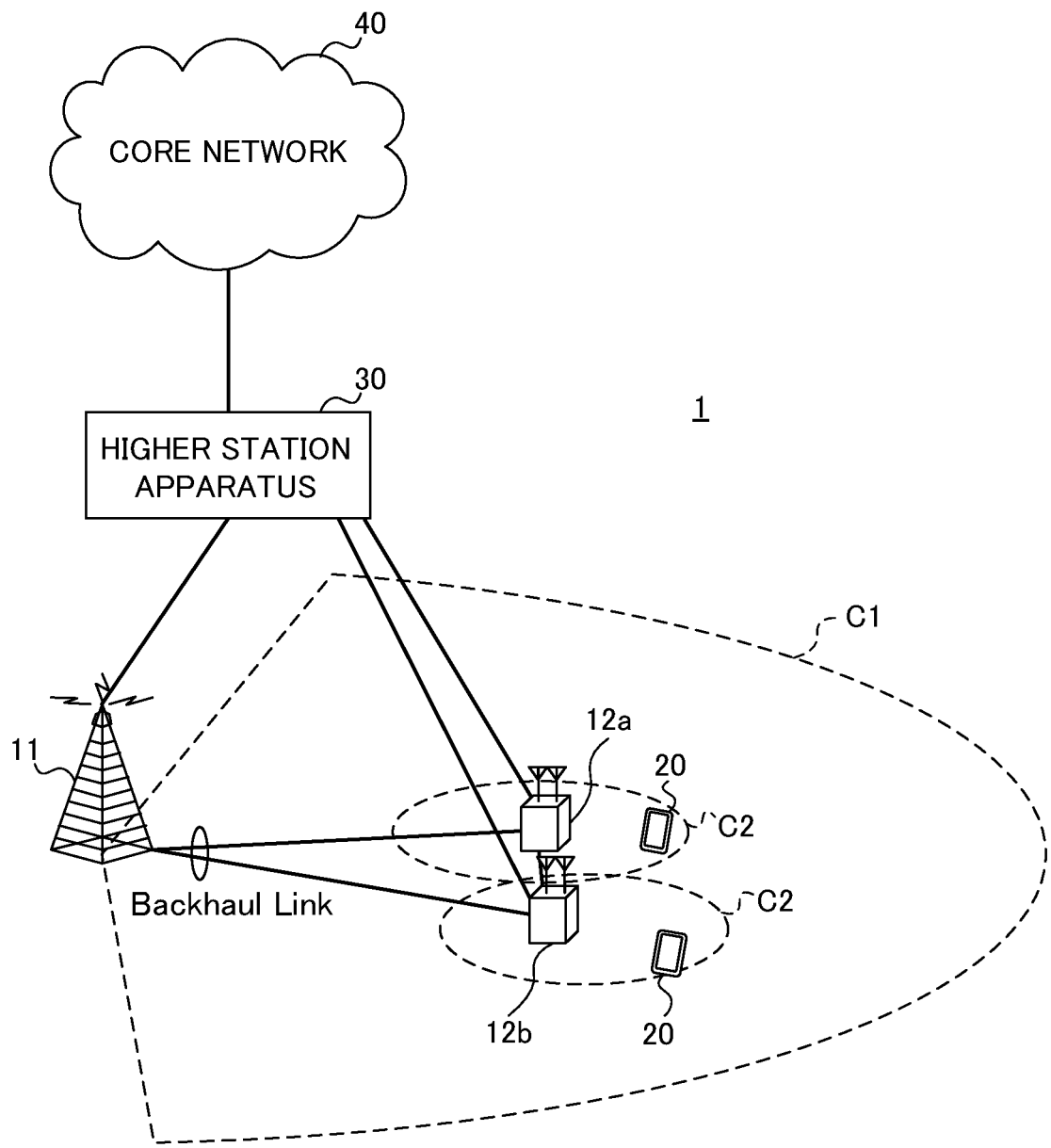
FIG. 18 is a diagram to show an example of a schematic structure of a radio communication system according to the present embodiment.

FIG. 18 is a diagram to show an example of a schematic structure of a radio communication system according to the present embodiment. Note that the radio communication system shown in FIG. 18 is, for example, the LTE system or a system to incorporate SUPER 3G. This radio communication system can adopt carrier aggregation (CA) to group a plurality of fundamental frequency blocks (component carriers) into one, where the system bandwidth of the LTE system constitutes one unit, and/or dual connectivity (DC). Also, this radio communication system may be referred to as "IMT-Advanced," "4G," "FRA (Future Radio Access)" and so on.

The radio communication system 1 shown in FIG. 18 includes a radio base station 11 that forms a macro cell C1, and radio base stations 12a and 12b that are placed inside the macro cell C1 and form small cells C2, which are narrower than the macro cell C1. Also, user terminals 20 are placed in the macro cell C1 and in each small cell C2. Also, CA and/or DC is applied between the radio base station 11 and the radio base stations 12, between the radio base station 11 and other radio base stations 11, or between the radio base stations 12 and other radio base station 12. Note that CA may be referred to as "intra-base-station CA (intra-eNB CA)," and DC may be referred to as "inter-base-station CA (inter-eNB CA)."

Between the user terminals 20 and the radio base station 11, communication is carried out using a carrier of a relatively low frequency band (for example, 2 GHz) and a wide bandwidth (referred to as, for example, "existing carrier," "legacy carrier" and so on). Meanwhile, between the user terminals 20 and the radio base stations 12, a carrier of a relatively high frequency band (for example, 3.5 GHz) and a wide bandwidth may be used, or the same carrier as that used in the radio base station 11 may be used. A new carrier type (NCT) may be used as the carrier type between the user terminals 20 and the radio base stations 12. A wire connection (optical fiber, the X2 interface, etc.) or a wireless connection is established between the radio base station 11 and the radio base stations 12 (or between the radio base stations 12).

The radio base station 11 and the radio base stations 12 are each connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "home eNodeBs," "micro base stations," "transmitting/receiving points" and so on. The radio base stations 11 and 12 will be hereinafter collectively referred to as a "radio base station 10," unless specified otherwise. Each user terminal 20 is a terminal to support various communication schemes such as LTE, LTE-A and so on, and may be both a mobile communication terminal and a stationary communication terminal.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks, per terminal, and allowing a plurality of terminals to use mutually different bands.

Now, communication channels used in the radio communication system shown in FIG. 18 will be described. Downlink communication channels include a PDSCH (Physical Downlink Shared CHannel), which is used by each user terminal 20 on a shared basis, and downlink L1/L2 control channels (PDCCH, PCFICH, PHICH and enhanced PDCCH). User data and higher control information are communicated by the PDSCH. Downlink control information (DCI) such as scheduling information pertaining to the PDSCH and the PUSCH is communicated by the by the PDCCH (Physical Downlink Control Channel). The number of OFDM symbols to use for the PDCCH is communicated by the PCFICH (Physical Control Format Indicator CHannel). HARQ ACKs/NACKs in response to the PUSCH are communicated by the PHICH (Physical Hybrid-ARQ Indicator Channel). Also, the scheduling information for the PDSCH and the PUSCH may be communicated by the enhanced PDCCH (EPDCCH) as well. This EPDCCH is frequency-division-multiplexed with the PDSCH (downlink shared data channel).

Uplink communication channels include a PUSCH (Physical Uplink Shared CHannel), which is used by each user terminal 20 on a shared basis as an uplink data channel, and a PUCCH (Physical Uplink Control CHannel), which is an uplink control channel. User data and higher control information are communicated by this PUSCH. Also, downlink radio quality information (CQI: Channel Quality Indicator) and uplink control information (UCI) such as ACKs/ NACKs are communicated by the PUCCH.

Figure 19:
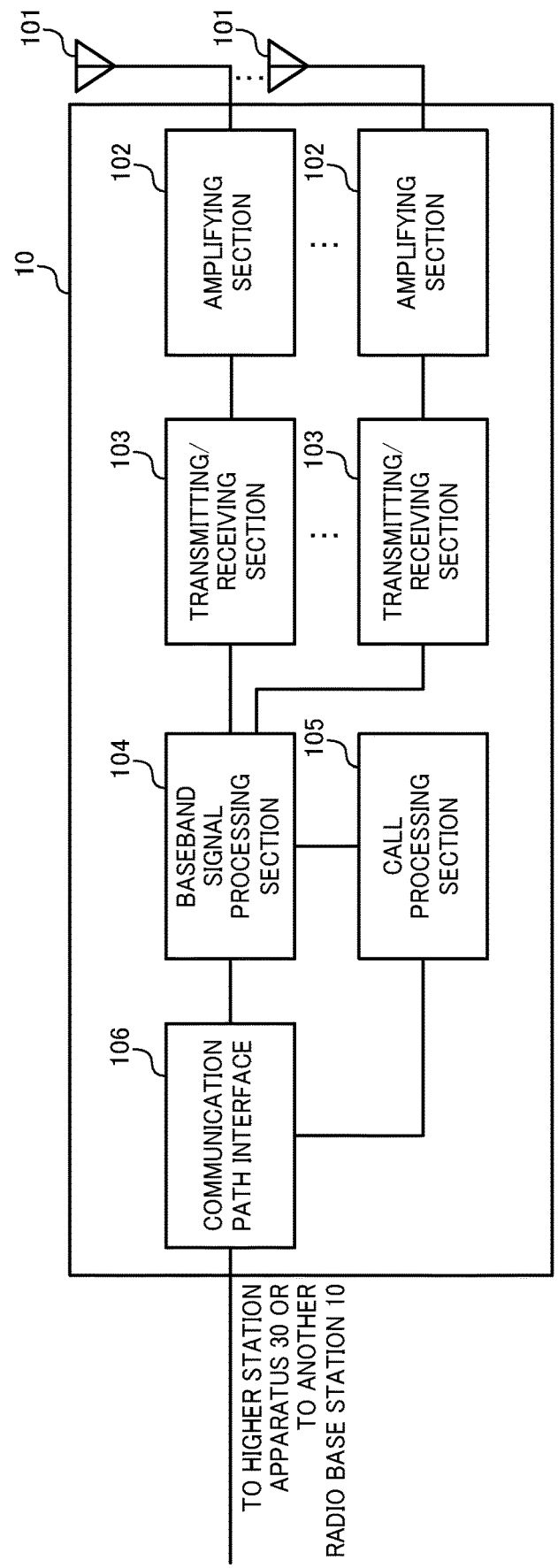
FIG. 19 is a diagram to show an example of an overall structure of a radio base station according to the present embodiment.

FIG. 19 is a diagram to show an example of an overall structure of a radio base station 10 (which may be either a radio base station 11 or 12) according to the present embodiment. The radio base station 10 has a plurality of transmitting/receiving antennas 101 for MIMO (Multi Input Multi Output) communication, amplifying sections 102, transmitting/receiving section 103, a baseband signal processing section 104, a call processing section 105 and a communication path interface 106.

User data to be transmitted from the radio base station 10 to a user terminal 20 on the downlink is input from the higher station apparatus 30, into the baseband signal processing section 104, via the communication path interface 106.

In the baseband signal processing section 104, a PDCP layer process, division and coupling of user data, RLC (Radio Link Control) layer transmission processes including an RLC retransmission control transmission process, MAC (Medium Access Control) retransmission control (for example, an HARQ (Hybrid ARQ) transmission process), scheduling, transport format selection, channel coding, an inverse fast Fourier transform (IFFT) process and a precoding process are performed, and the result is forwarded to each transmitting/receiving section 103. Furthermore, downlink control channel signals are also subjected to transmission processes such as channel coding and an inverse fast Fourier transform, and are forwarded to each transmitting/receiving section 103.

Also, the baseband signal processing section 104 reports, to the user terminal 20, control information for allowing communication in the cell, through higher layer signaling (RRC signaling, broadcast signals and so on). The information for allowing communication in the cell includes, for example, the uplink or the downlink system bandwidth, feedback resource information and so on. Each transmitting/receiving section 103 converts baseband signals that are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, as for data to be transmitted from the user terminal 20 to the radio base station 10 on the uplink, radio frequency signals that are received in the transmitting/receiving antennas 101 are each amplified in the amplifying sections 102, converted into the baseband signal through frequency conversion in each transmitting/receiving section 103, and input in the baseband signal processing section 104.

In the baseband signal processing section 104, user data that is included in the baseband signal that is input is subjected to an inverse fast Fourier transform (IFFT) process, an inverse discrete Fourier transform (IDFT) process, error correction decoding, a MAC retransmission control receiving process, and RLC layer and PDCP layer receiving processes, and the result is forwarded to the higher station apparatus 30 via the communication path interface 106. The call processing section 105 performs call processing such as setting up and releasing communication channels, manages the state of the radio base station 10 and manages the radio resources.

Figure 20:
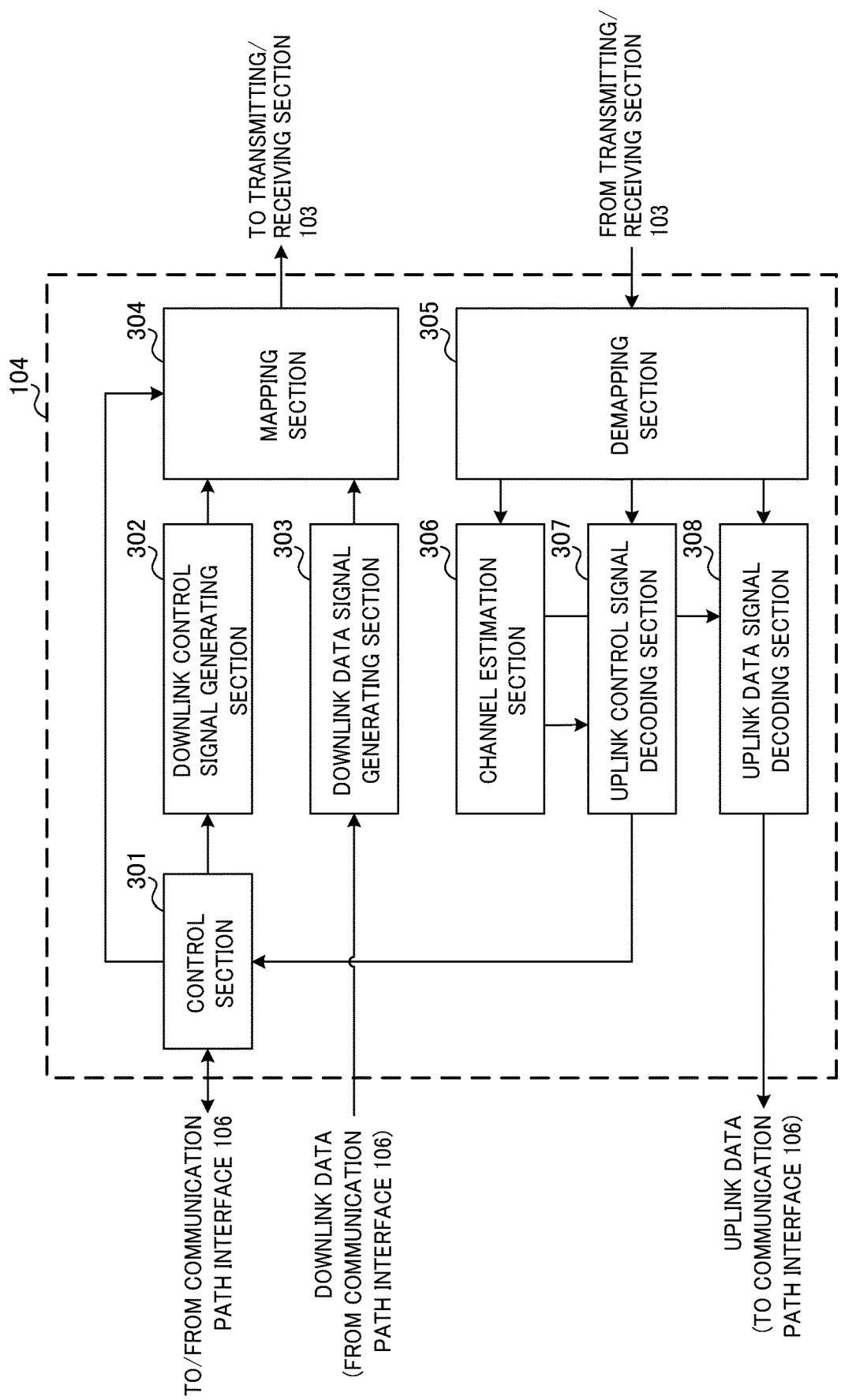
FIG. 20 is a diagram to shown an example of a functional structure of a radio base station according to the present embodiment.

FIG. 20 is a diagram to show an example of a principle functional structure of the baseband signal processing section 104 provided in the radio base station 10 according to the present embodiment. As shown in FIG. 20, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307 and an uplink data signal decoding section 308. Although only part of the structure of the baseband signal processing section 104 is shown here, assume that a structure to meet the needs is provided without shortage.

The control section 301 controls the scheduling of the downlink user data that is transmitted in the PDSCH, the downlink control information (DCI) that is communicated in the PDCCH and/or the enhanced PDCCH (EPDCCH), the downlink reference signals and so on. Also, the control section 301 controls the scheduling of the uplink data that is communicated in the PUSCH, the uplink control information that is communicated in the PUCCH or the PUSCH, the uplink reference signals and so on (allocation control). Information about the allocation control of uplink signals (uplink control signals and uplink user data) is reported to user terminals by using a downlink control signal (DCI).

To be more specific, the control section 301 controls the allocation of radio resources with respect to downlink signals and uplink signals, based on command information from the higher station apparatus 30, feedback information from each user terminal 20 and so on. That is, the control section 301 functions as a scheduler. Note that, when DC is applied to the user terminal 20, the control section 301 may be structured to control the scheduling of one or more cells, independently, per radio base station 10. Also, when CA is applied to the user terminal 20, the control section 301 may be structured to control the scheduling of multiple cells together, including cells of other radio base stations 10, or a structure may be employed in which the control sections 301 of other radio base stations 10 do not function as schedulers.

Also, when the PUCCH resources of the user terminal are determined depending on the resource and signal structure of the PDCCH/EPDCCH and so on, the control section 301 controls and reports the signal structure of the PDCCH/EPDCCH to the downlink control signal generating section 302.

The downlink control signal generating section 302 generates the downlink control signals (PDCCH signals and/or EPDCCH signals) determined to be allocated by the control section 301. To be more specific, based on commands from the control section 301, the downlink control signal generating section 302 generates DL assignments, which report downlink signal allocation information, and UL grants, which report uplink signal allocation information.

Note that, preferably, the downlink control signal generating section 302 is structured to generate the CIF of a downlink control signal in association with the PUCCH-transmitting cell pertaining to the cell where CCS is designated based on this CIF.

The downlink data signal generating section 303 generates downlink data signals (PDSCH signals) from the user data that is input from the communication path interface 106. The data signals that are generated in the data signal generating section 303 are subjected to a coding process and a modulation process based on coding rates and modulation schemes that are determined based on information such as the channel state information (CSI) from each user terminal 20.

Based on commands from the control section 301, the mapping section 304 controls the allocation of the downlink control signals generated in the downlink control signal generating section 302 and the downlink data signals generated in the downlink data signal generating section 303 to radio resources.

The demapping section 305 demaps uplink signals transmitted from the user terminal and separates the uplink signals. The channel estimation section 306 estimates channel states from the reference signals included in the received signals separated in the demapping section 305, and outputs the estimated channel states to the uplink control signal decoding section 307 and the uplink data signal decoding section 308.

The uplink control signal decoding section 307 decodes the feedback signals (delivery acknowledgement signals, etc.) transmitted from the user terminal through an uplink control channel (PUCCH), and outputs the results to the control section 301. The uplink data signal decoding section 308 decodes the uplink data signals transmitted from the user terminal through the uplink shared channel (PUSCH), and outputs the results to the communication path interface 106.

Figure 21:
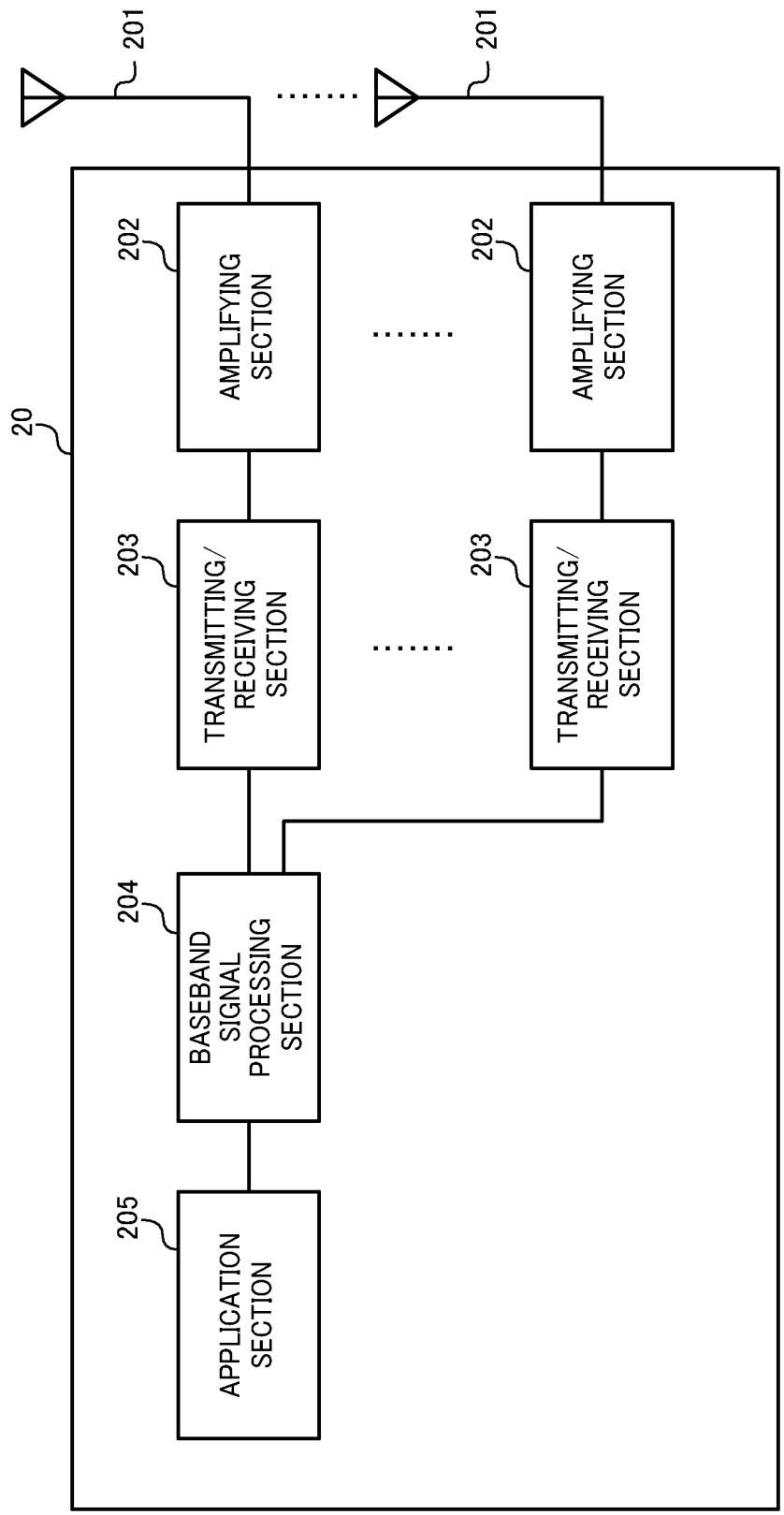
FIG. 21 is a diagram to show an example of an overall structure of a user terminal according to the present embodiment.

FIG. 21 is a diagram to show an example of an overall structure of a user terminal 20 according to the present embodiment. The user terminal 20 has a plurality of transmitting/receiving antennas 201 for MIMO communication, amplifying sections 202, transmitting/receiving section (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving section 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer. Furthermore, in the downlink data, broadcast information is also forwarded to the application section 205.

Meanwhile, uplink user data is input from the application section 205 to the baseband signal processing section 204. In the baseband signal processing section 204, MAC retransmission control (for example, HARQ transmission process), channel coding, precoding, a discrete Fourier transform (DFT) process, an IFFT process and so on are performed, and the result is forwarded to each transmitting/receiving section 203. The baseband signal that is output from the baseband signal processing section 204 is converted into a radio frequency band in the transmitting/receiving section 203. After that, the amplifying sections 202 amplify the radio frequency signal having been subjected to frequency conversion, and transmit the resulting signal from the transmitting/receiving antennas 201.

Figure 22:
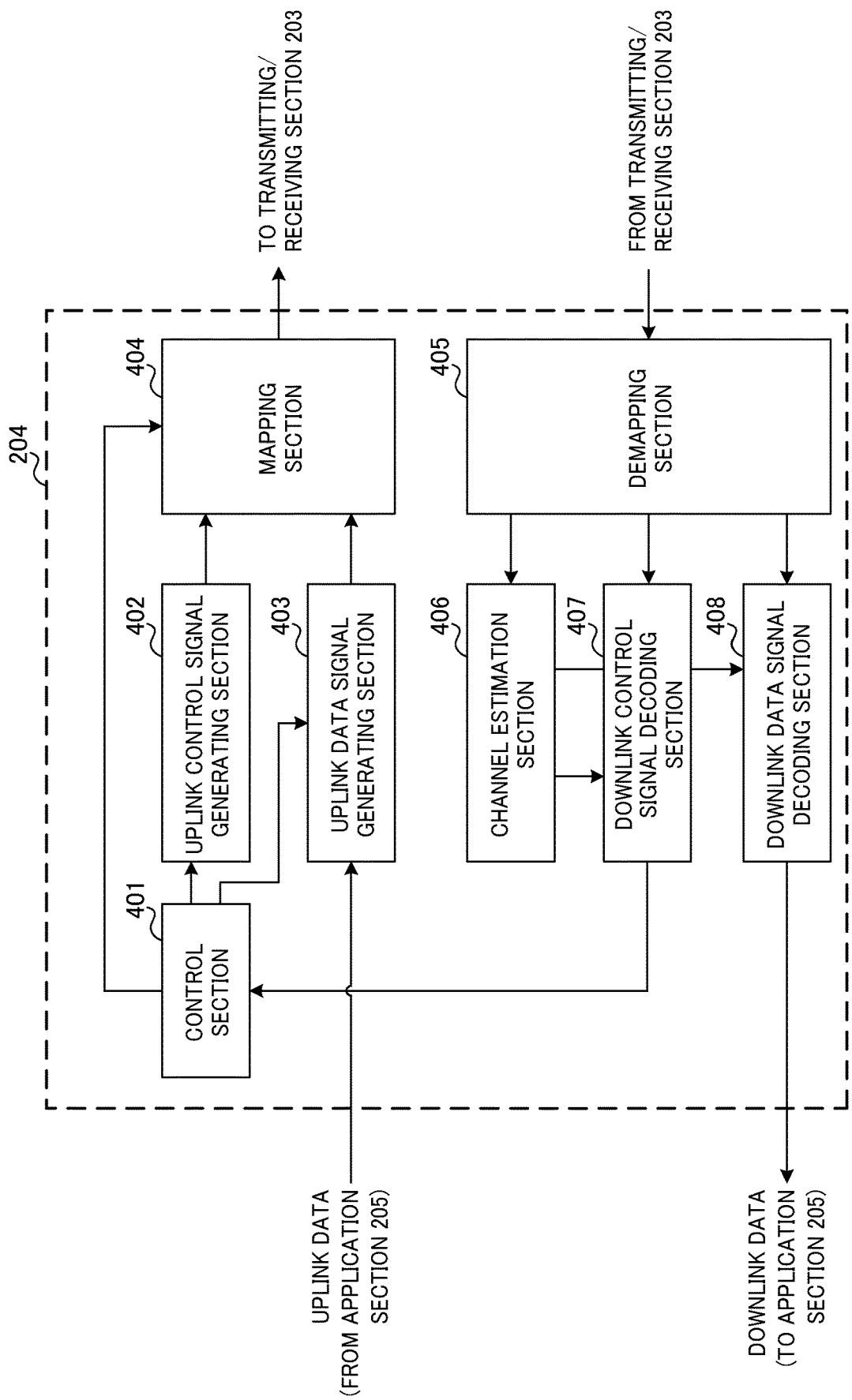
FIG. 22 is a diagram to show an example of a functional structure of a user terminal according to the present embodiment.

FIG. 22 is a diagram to show an example of a principle functional structure of the baseband signal processing section 204 provided in the user terminal 20. As shown in FIG. 22, the baseband signal processing section 204 provided in the user terminal 20 is comprised at least of a control section 401, an uplink control signal generating section 402, an uplink data signal generating section 403, a mapping section 404, a demapping section 405, a channel estimation section 406, a downlink control signal decoding section 407 and a downlink data signal decoding section 408. Although only part of the structure of the baseband signal processing section 204 is shown here, assume that a structure to meet the needs is provided without shortage.

The control section 401 controls the generation of uplink control signals (feedback signals) and uplink data signals based on downlink control signals (PDCCH signals) transmitted from the radio base station, the PDSCH signals received, and so on. The downlink control signals are output from the downlink control signal decoding section 407. Also, the control section 401 may manage information that is required for communication with the radio base station 10, such as information as to whether or not DC is applied to the user terminal 20, whether or not CA is applied, and so on.

Also, the control section 401 also functions as a feedback control section that controls the feedback of delivery acknowledgement signals (ACKs/NACKs) in response to PDSCH signals. To be more specific, the control section 401 controls the selection of the cell (CC) to feed back acknowledgment response signals, the PUCCH resources to allocate the acknowledgment response signals to, and so on. The control section 401 determines the cell to which the acknowledgment response signals are fed back, and the PUCCH resources to use, based on downlink control signals that are transmitted from the radio base station, and sends command to the uplink control signal generating section 402 and the mapping section 404.

To be more specific, when information to indicate CCS is included in a PDCCH signal, the control section 401 decides whether the cell that has received the PDCCH signal and the cell that is designated based on the CCS belong to the same CG.

Then, when DC is applied to the user terminal 20 (example 1 of the present embodiment) and the decision made above is true, the control section 401 selects the PUCCH-configurable cell of the CG where the cell having received the PDCCH signal belongs as the PUCCH-transmitting cell, and commands the uplink control signal generating section 402 and the mapping section 404 to allocate PUCCH resources to the PUCCH-transmitting cell and send UCI feedback. Also, if the decision made above is false, the control section 401 selects the PUCCH-configurable cell of the CG where the PDCCH-receiving cell belongs as the PUCCH-transmitting cell, and commands the uplink control signal generating section 402 and the mapping section 404 to either allocate PUCCH resources to the PUCCH-transmitting cell and feed back a NACK or execute DTX.

On the other hand, when CA is applied to the user terminal 20 (example 2 of the present embodiment) and the decision made above is true, the control section 401 selects the PUCCH-configurable cell in the CG where the cell having receive the PDCCH signal belongs as the PUCCH-transmitting cell, and commands the uplink control signal generating section 402 and the mapping section 404 to allocate PUCCH resources to the PUCCH-transmitting cell and send UCI feedback. Also, if the decision made above is false, the same may hold as when the decision is true (example 2.1 of the present embodiment), or the control section 401 selects the PUCCH-configurable cell of the CG where the cell that is scheduled based on the CCS belongs as the PUCCH-transmitting cell (example 2.2 of the present embodiment), and commands the uplink control signal generating section 402 and the mapping section 404 to allocate PUCCH resources to the PUCCH-transmitting cell and send UCI feedback.

The control section 401 can make the above decision based, for example, on the CIF. For example, "true" holds when the cell having received a PDCCH in which a CIF is configured and the cell that is designated by the number included in the CIF belong to the same CG, or "false" holds when these cells belong to different CGs. Also, if the CIF is configured to be generated in association with the PUCCH-transmitting cell pertaining to the cell that is designated based on CCS (the cell where the PDSCH is demodulated), it is possible to select the PUCCH-transmitting cell with reference to the relationship between the CIF value and the PUCCH-transmitting cell. In this case, a structure may be employed in which the above-noted decision making in the control section 401 is omitted. Note that the information to be associated with the CIF value (the cell where the PDSCH is demodulated, the PUCCH-transmitting cell and so on) may be configured by higher layer signaling (RRC signaling, broadcast signals and so on). Also, other pieces of information may be associated with the CIF value as well.

Note that the control section 401 may decide whether DC is applied and/or whether CA is applied based on information that is reported from the network (for example, the radio base station 10, the higher station apparatus 30 and so on). This structure makes it possible to switch between examples 1 and 2 in an adaptive manner. This information may be a direct piece of information to indicate that DC or CA is applied, or may be an indirect piece of information (for example, information to indicate that an MCG and an SCG are configured, information regarding the architecture to use in communication, information regarding backhaul and so on). Also, this information may be configured based on higher layer signaling (RRC signaling, broadcast signals and so on), or may be included in downlink signals.

The uplink control signal generating section 402 generates uplink control signals (feedback signals such as acknowledgment response signals and CSI) based on commands from the control section 401. Also, the uplink data signal generating section 403 generates uplink data signals based on commands from the control section 401. Note that, when an uplink grant is contained in a downlink control signal reported from the radio base station, the control section 401 commands the uplink data signal 403 to generate an uplink data signal.

The mapping section 404 (allocation section) controls the allocation of the uplink control signals (feedback signals) and the uplink data signals to radio resources based on commands from the control section 401. For example, depending on the cell (CC) to send feedback via the PUCCH, the mapping section 404 allocates feedback signals to the PUCCH of that cell.

The demapping section 405 demaps the downlink signals transmitted from the radio base station 10 and separates the downlink signals. The channel estimation section 406 estimates channel states from the reference signals included in the received signals separated in the demapping section 405, and outputs the estimated channel states to the downlink control signal decoding section 407 and the downlink data signal decoding section 408.

The downlink control signal decoding section 407 decodes the downlink control signals (PDCCH signals) transmitted in the downlink control channel (PDCCH), and outputs the scheduling information (information regarding the allocation to uplink resources) to the control section 401.

The downlink data signal decoding section 408 decodes the downlink data signals transmitted via the downlink shared channel (PDSCH) and outputs the results to the application section 205.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of claims. For example, a plurality of examples described above may be combined and implemented as appropriate. Consequently, the description herein is provided only for the purpose of explaining examples, and should by no means be construed to limit the present invention in any way.

The disclosure of Japanese Patent Application No. 2013-268332, filed on Dec. 26, 2013, including the specification, drawings and abstract, is incorporated herein by reference in its entirety.

The invention claimed is:

1. A user terminal that communicates in a plurality of cell groups, each group being formed with one or more cells, the user terminal comprising:
   a receiver that receives downlink control information; and
   a processor that controls at least a first cell to transmit uplink control information, among a plurality of cells to which the uplink control information can be allocated and which are configured in each cell group,
   wherein, when information to indicate cross-carrier scheduling is included in the downlink control information, and
   when a second cell having received the downlink control information and a third cell that is designated by the information to indicate cross-carrier scheduling belong to a first cell group of the plurality of cell groups,
   then the processor determines the at least first cell among the plurality of cells for a physical uplink control channel (PUCCH) based on the information to indicate cross-carrier scheduling and
   controls the at least first cell among the plurality of cells, to which uplink control information can be allocated and that is included in the first cell group to which the second cell that receives the downlink control information belongs to, to transmit the uplink control information on the PUCCH, and
   wherein, when the third cell that is designated by the information to indicate cross-carrier scheduling belongs to a second cell group of the plurality of cell groups, the processor does not support cross-carrier scheduling between the second cell that receives the downlink control information, which belongs to the first cell group and the third cell designated by information indicating the cross-carrier scheduling, which belongs to the second cell group.

2. The user terminal according to claim 1, wherein the cross-carrier scheduling from a cell other than the first cell to which uplink control information can be allocated, to the first cell to which uplink control information can be allocated, is not supported by the processor.

3. A radio communication method for a user terminal that communicates in a plurality of cell groups, each group being formed with one or more cells, the radio communication method comprising:
   receiving downlink control information; and
   controlling at least a first cell to transmit the uplink control information, among a plurality of cells to which uplink control information can be allocated and which are configured in each cell group,
   wherein in the controlling, when information to indicate cross-carrier scheduling is included in the downlink control information, and
   when a second cell having received the downlink control information and a third cell that is designated by the information to indicate cross-carrier scheduling belong to a first cell group of the plurality of cell groups, then the at least first cell among the plurality of cells is determined for a physical uplink control channel (PUCCH) based on the information to indicate cross-carrier scheduling and the at least first cell among the plurality of cells, to which uplink control information can be allocated and that is included in the first cell group to which the second cell that receives the downlink control information belongs to, is controlled to transmit the uplink control information on the PUCCH, and wherein, when the third cell that is designated by the information to indicate cross-carrier scheduling belongs to a second cell group of the plurality of cell groups, in the controlling, cross-carrier scheduling is not supported between the second cell that receives the downlink control information, which belongs to the first cell group and the third cell designated by information indicating cross-carrier scheduling, which belongs to the second cell group.

* * * * *